Feb. 25, 1941.   J. NICOL   2,233,323
VEHICLE
Filed April 16, 1938   13 Sheets-Sheet 1

Inventor
John Nicol
By Strauch & Hoffman
Attorneys

Feb. 25, 1941.  J. NICOL  2,233,323
VEHICLE
Filed April 16, 1938   13 Sheets-Sheet 2

Inventor
John Nicol
By Strauch & Hoffman
Attorneys

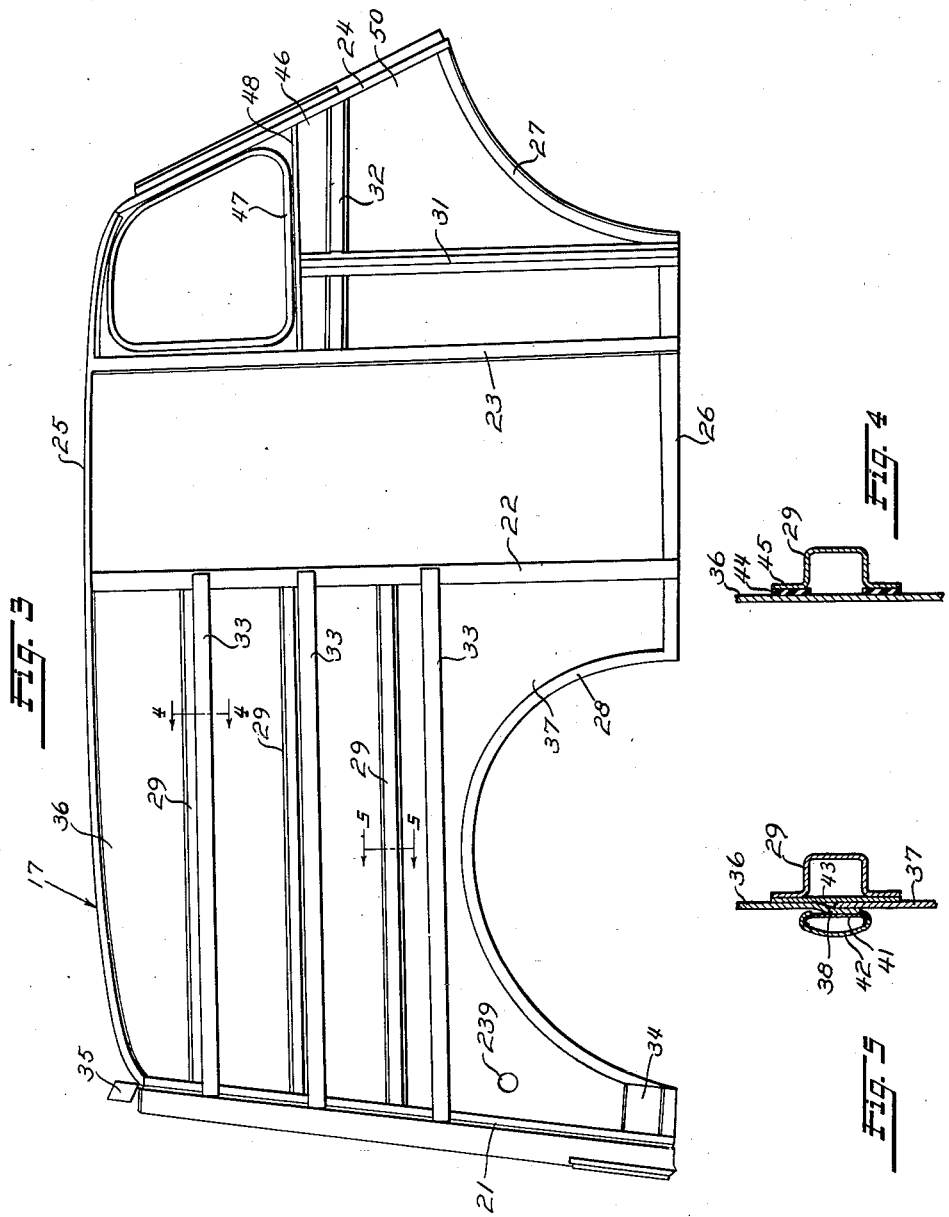

Feb. 25, 1941.    J. NICOL    2,233,323
VEHICLE
Filed April 16, 1938    13 Sheets-Sheet 4

Inventor
John Nicol
Strauch & Hoffman
Attorneys

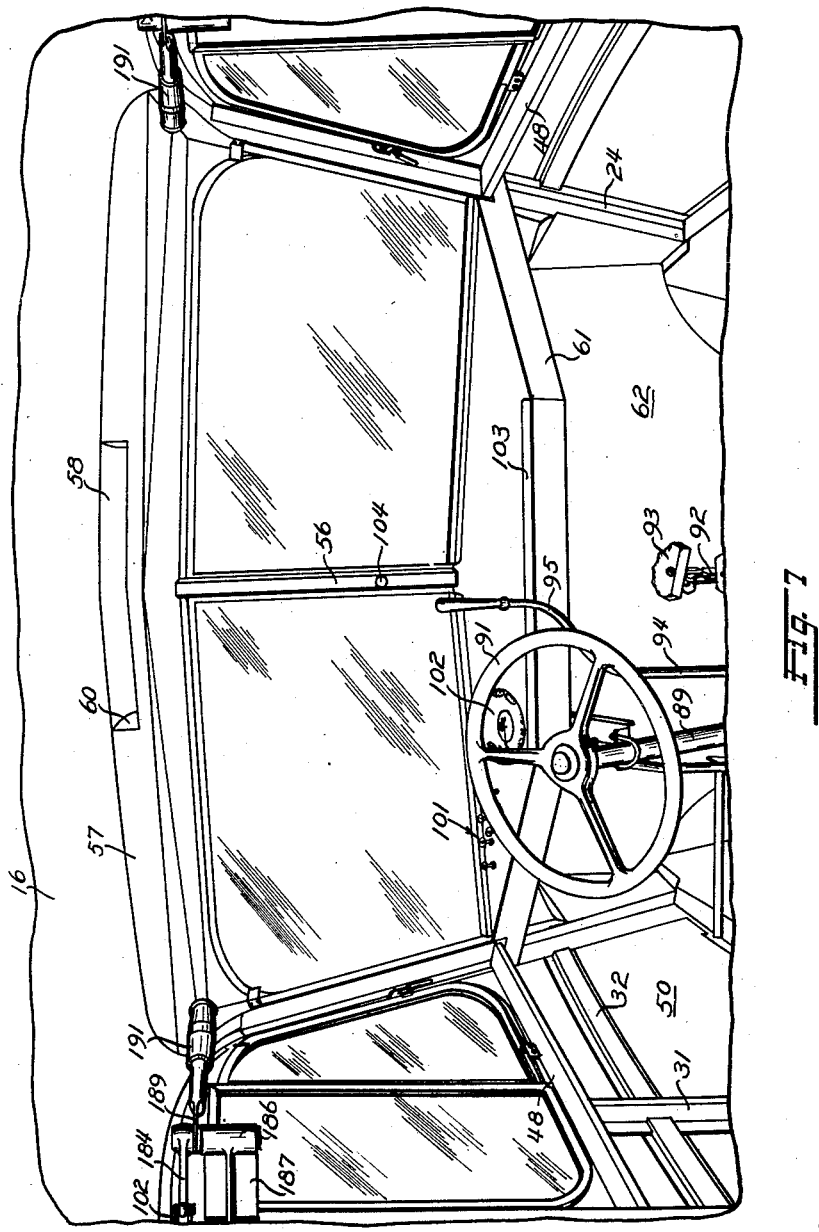

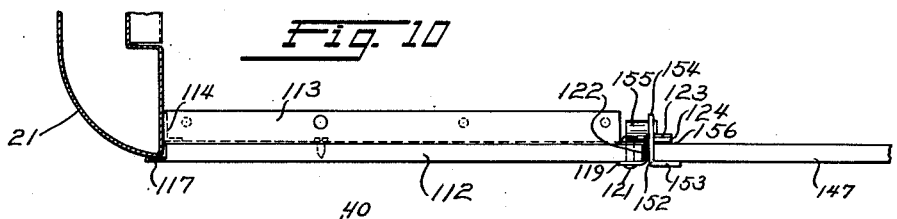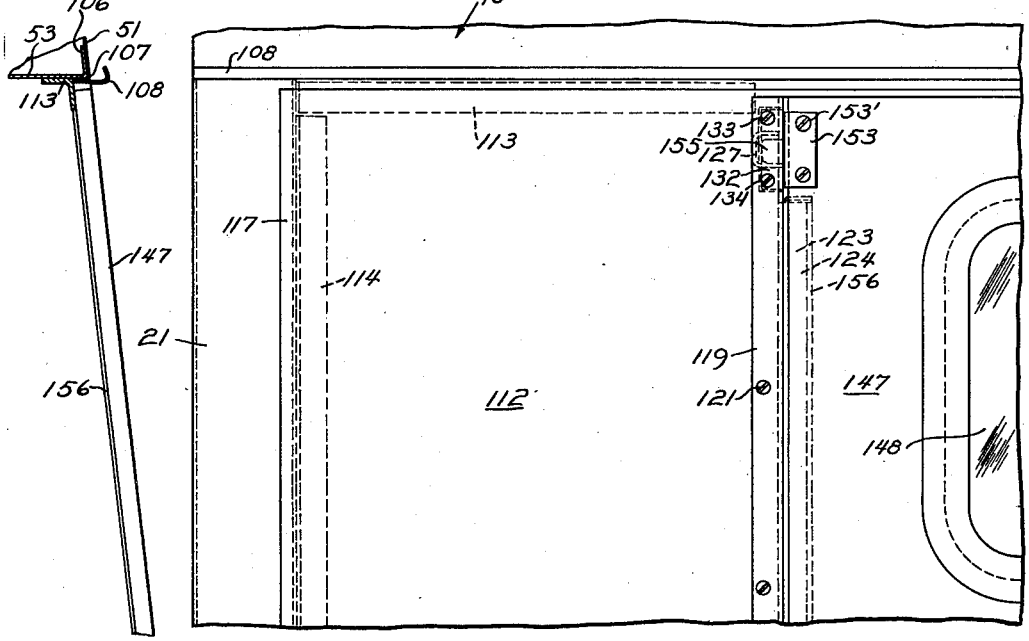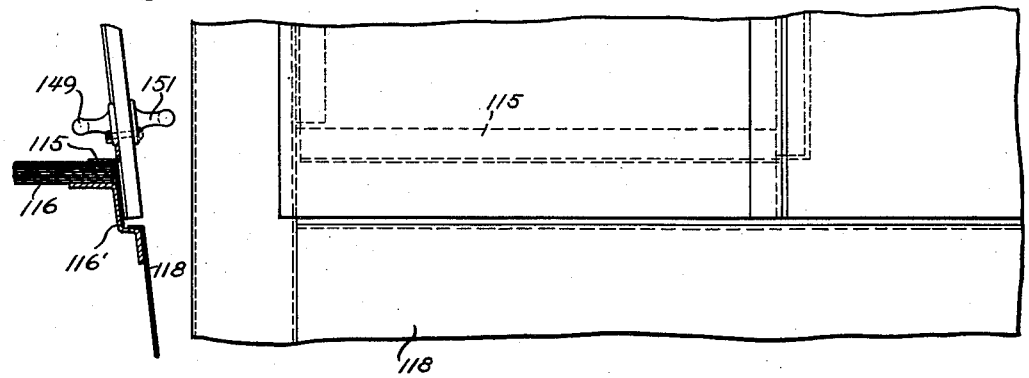

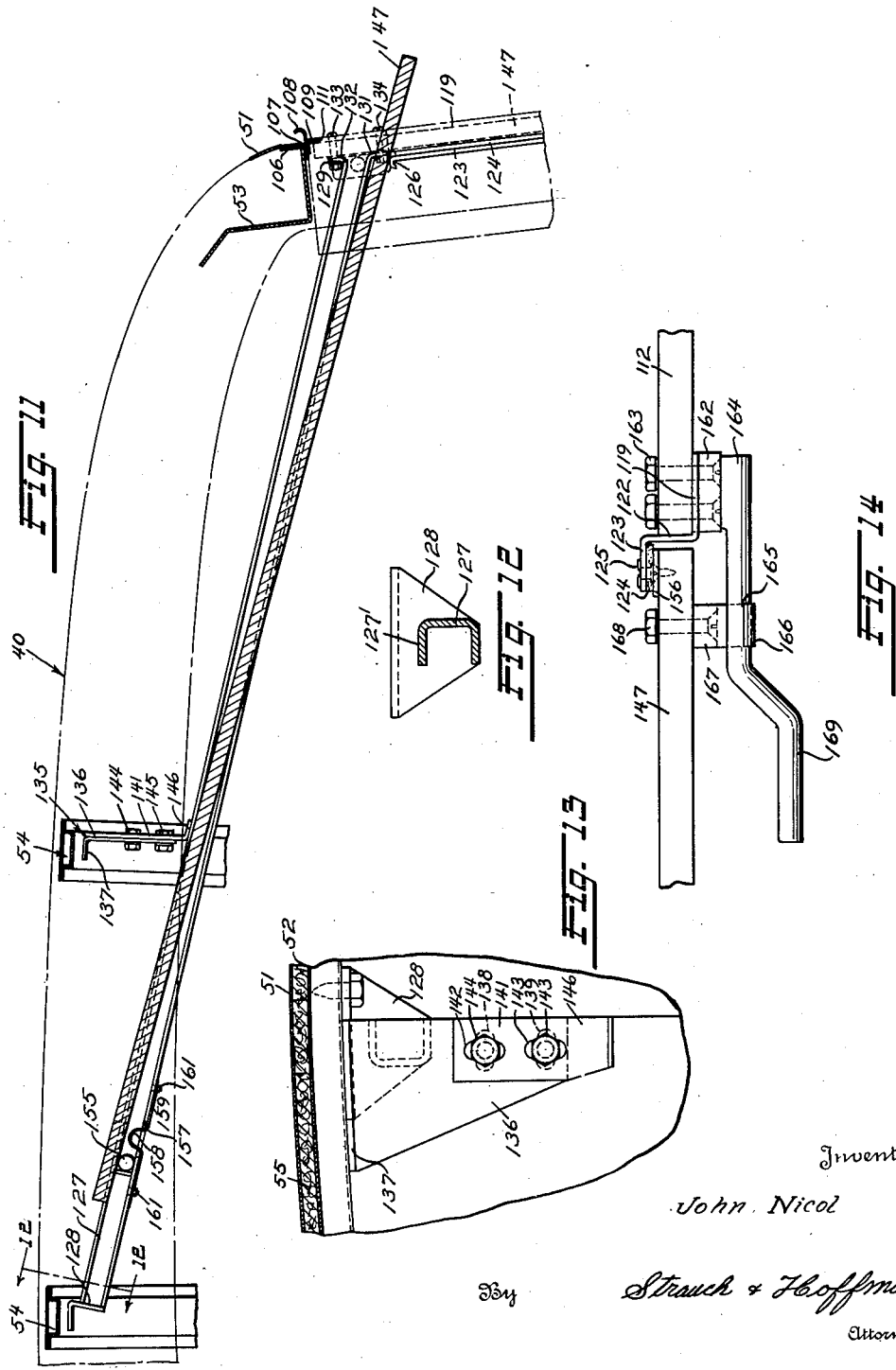

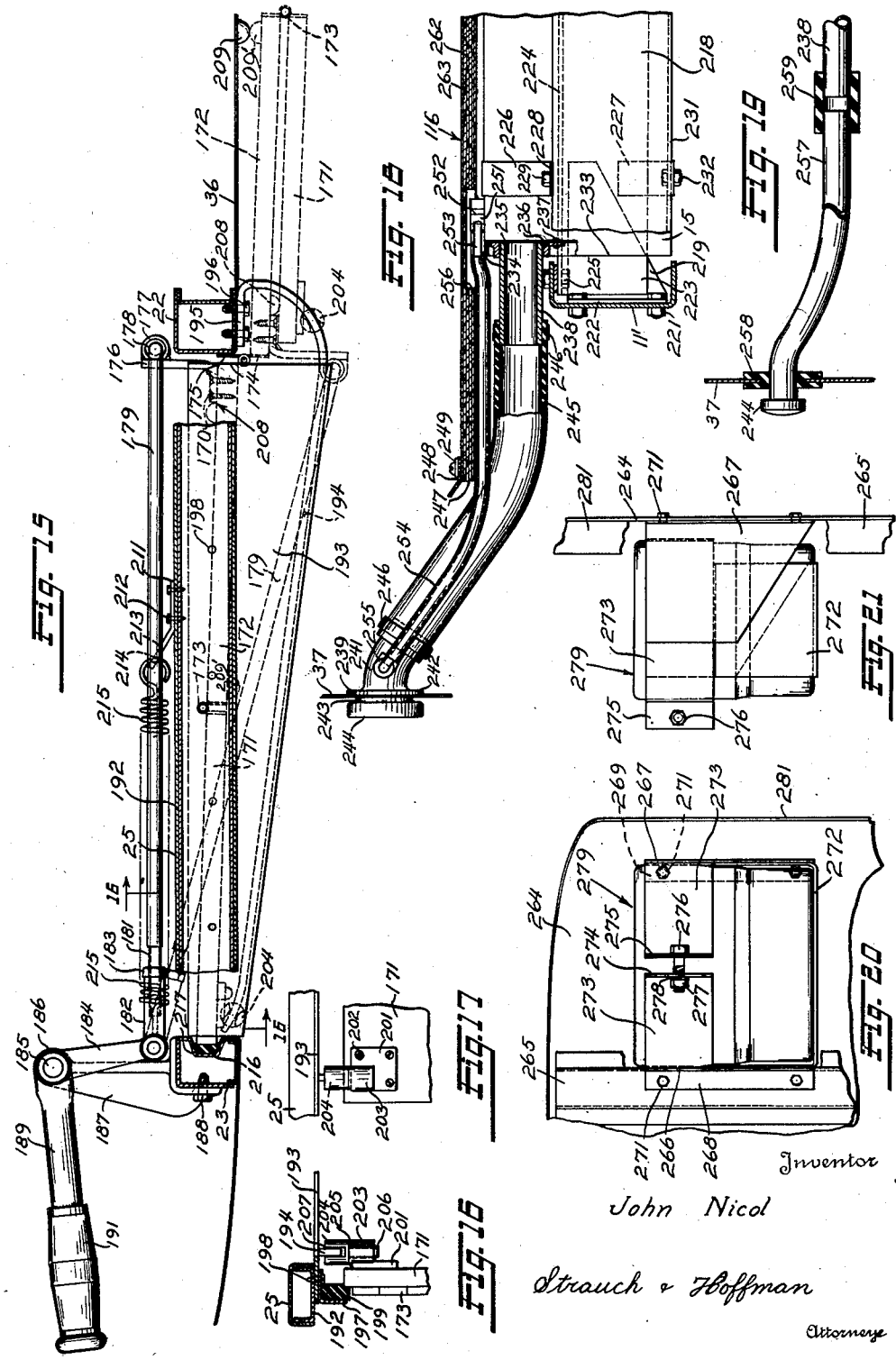

Feb. 25, 1941.  J. NICOL  2,233,323
VEHICLE
Filed April 16, 1938    13 Sheets-Sheet 9

Inventor
John Nicol
Strauch & Hoffman
Attorneys

Feb. 25, 1941.    J. NICOL    2,233,323
VEHICLE
Filed April 16, 1938    13 Sheets-Sheet 10

Inventor
John Nicol
Strauch & Hoffman
Attorneys

Feb. 25, 1941. J. NICOL 2,233,323
VEHICLE
Filed April 16, 1938 13 Sheets-Sheet 11

Inventor
John Nicol
By Strauch & Hoffman
Attorneys

Feb. 25, 1941.  J. NICOL  2,233,323
VEHICLE
Filed April 16, 1938   13 Sheets-Sheet 12
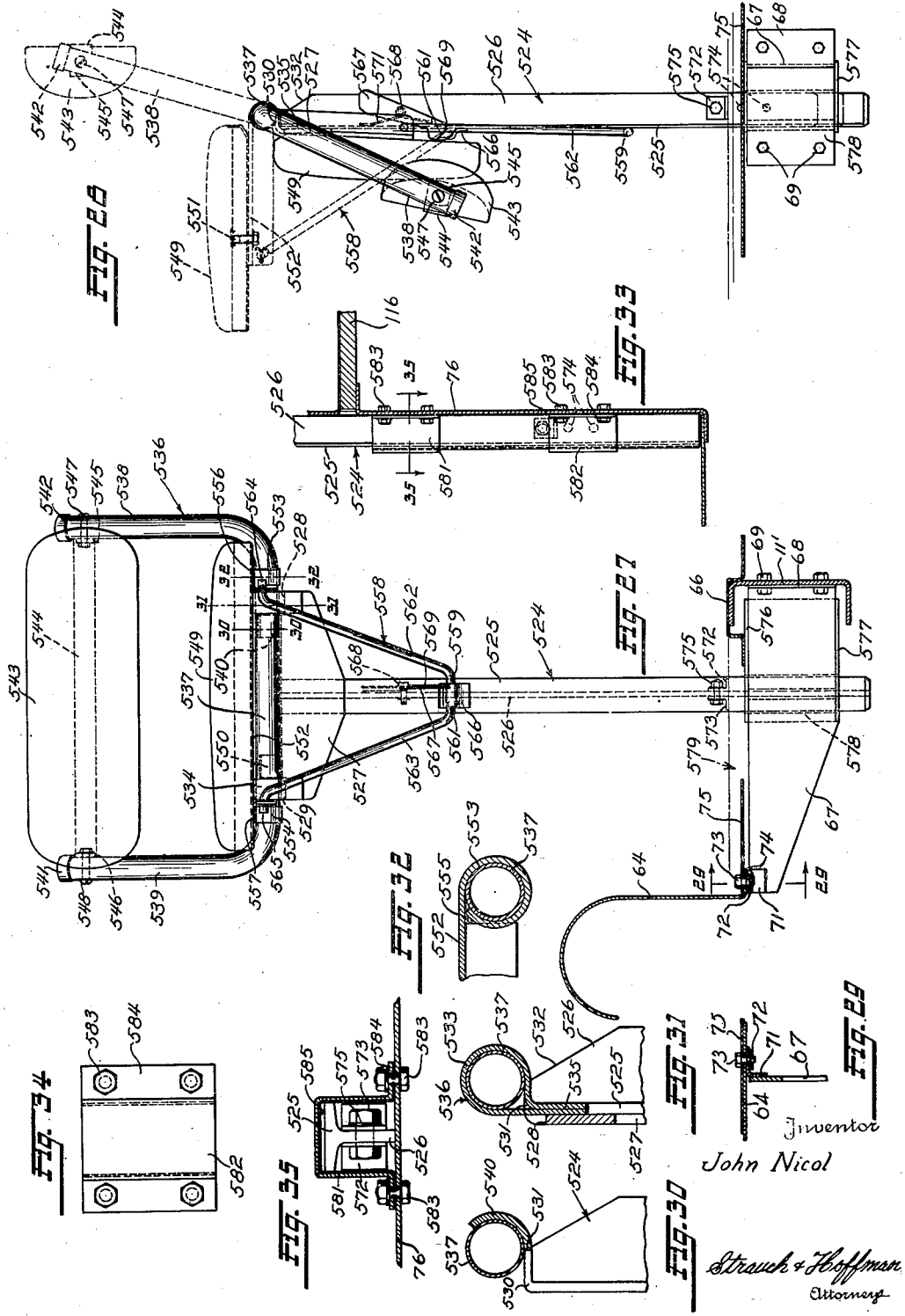
Inventor
John Nicol
Strauch & Hoffman
Attorneys Feb. 25, 1941.    J. NICOL    2,233,323
VEHICLE
Filed April 16, 1938    13 Sheets-Sheet 13
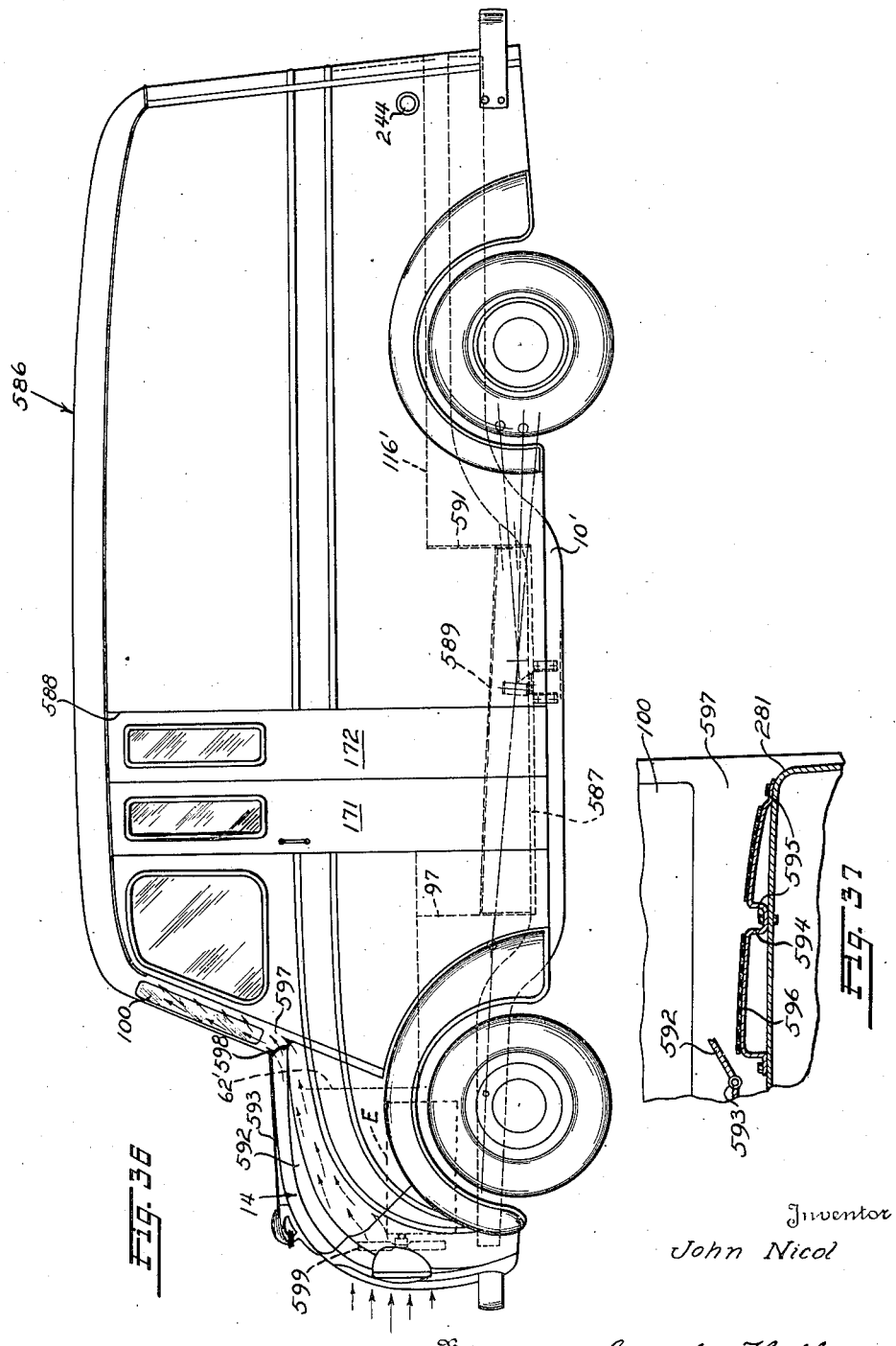
Inventor
John Nicol
By
Strauch & Hoffman
Attorneys Patented Feb. 25, 1941

2,233,323

UNITED STATES PATENT OFFICE 2,233,323

VEHICLE

John Nicol, Detroit, Mich., assignor to Divco Twin Truck Company, Detroit, Mich., a corporation of Michigan Application April 16, 1938, Serial No. 202,536

15 Claims. (Cl. 296—25)

My invention relates to vehicles and is more particularly concerned with vehicles of the type used for delivery or pick-up service of milk, laundry, small packages or the like.

While making house-to-house calls the driver of a delivery vehicle usually drives only a short distance from one stop to the next where he alights, makes the delivery and then returns to start up the vehicle again. With the usual types of delivery vehicle, this involves much stooping, bending and other physical labor since the stops are usually very numerous and the driver soon becomes tired and less efficient. In this condition he often makes mistakes and may even be involved in traffic accidents.

In recognition of this problem some vehicles for delivery and pick-up service have heretofore been designed to at least partially relieve the strain on the driver so that his efficiency might be improved. Some of these vehicles, many of which are now in use, are provided with low floor lines and rearranged controls so that the driver may enter the vehicle by a single step from the roadway level and drive the vehicle while standing upright therein on one foot and using the other foot to operate controls for the vehicle. In addition, vehicles of this type have been designed to provide a large amount of cargo space.

While vehicles of the prior art embodying the above mentioned features represent forward steps in the development of such vehicles for efficient and economic delivery service, even the best of them still contain control arrangements which fall short of maximum convenience in operation, and the cargo space is generally designed with a view toward maximum capacity alone without considering the attendant problem of ease and convenience in handling the cargo.

In overcoming these and many other disadvantages of the prior art it is a major object of my invention to provide a novel vehicle which is designed especially to speed up delivery of light merchandise and the like.

A further object of my invention is to provide a novel delivery vehicle in which ample cargo space is provided at the front of the body for accommodating parcels which are to be delivered before the merchandise inside the rear body compartment. In specific attainment of this object the vehicle control mechanism has been regrouped to occupy a minimum of space while at the same time being conveniently accessible to the driver and a special platform is built into the front end of the body.

A further object of my invention is to provide a novel delivery vehicle having a low floor through aisle for convenience in entering or leaving the vehicle while making deliveries and having a low floor driving compartment communicating therewith, but forwardly disposed therefrom, so that the driver will be enterely out of the through aisle when he is standing at the vehicle controls.

It is a further object of my invention to provide a novel delivery vehicle having a low floor through aisle and ample cargo space in the body forwardly of the aisle and easily available therefrom and wherein waste liquids, such as water dripping from iced milk crates, are prevented from draining out of the cargo space onto the floor of the vehicle. In specific attainment of this object raised ridges or dams are provided along those edges of the cargo space which are not adjacent the body panels. Also, conductor pipes are provided leading from the aisle floor to the ground for draining off any liquid which might accidentally be spilled on the floor.

A further object of my invention is to provide a delivery vehicle in which the controls are grouped in a novel manner for efficient manipulation by the driver whether he is standing or sitting. In connection with this object, the hand service brake lever is extended upwardly to pass adjacent the periphery of the steering wheel so that the driver can instantly grasp the brake lever with one hand while the other is kept on the steering wheel.

It is a further object of my invention to provide a vehicle having a novel instrument board which serves also as a writing table and a lateral body strengthening member.

A further object of my invention is to provide a vehicle having novel windshield header construction.

A further object of my invention is to provide a vehicle having a novel arrangement for admitting fuel into the fuel reservoir. In connection with this object I provide a flexible fuel conduit extending partly through the body and a cover inside the body for protecting the conduit.

A further object of my invention is to provide a delivery vehicle having novel body construction which is sturdy and tight and free from objectionable body noises but which at the same time is light and provides plenty of cargo space with convenient access thereto. In specific attainment of this object the body comprises a plurality of frame units which are made substantially unitary by welding and these units are combined to form a rigid tight body assembly.

Still a further object of my invention is to provide a vehicle having novel body construction in which resilient material is provided between the side frames and the panels to reduce body noises and compensate for panel irregularities.

A further object of my invention is to provide a vehicle having novel rear compartment floor construction for insulating the rear compartment against heat from the pavement and other sources below the vehicle.

A further object of my invention is to provide a vehicle whose body is provided with novel side door construction wherein double folding side doors are operated from control handles at the upper front end of the body. In connection with this object a novel door guide arrangement is contemplated and special means are provided for shedding water above the door openings.

A further object of my invention is to provide a vehicle having a novel sliding door arrangement at the rear of the body compartment.

It is a further object of my invention to provide a novel clutch and brake control mechanism operated by a single control lever and wherein the clutch, after disengagement, is prevented from interfering with brake control operation of the lever.

A further object of my invention is to provide a vehicle having a novel mounting for supporting the master hydraulic brake cylinder upon one of the engine support brackets which are disposed between the engine and the chassis.

A further object of my invention is to provide a standrive delivery vehicle having a novel battery supporting bracket secured to the front end of the body beneath the engine hood. This is especially important in a delivery vehicle of this type in which the battery cannot be placed under the front seat as in the ordinary automobile.

A further object of my invention is to provide a novel driver's seat assembly which is adjustable to permit operation of the vehicle from full sitting, half sitting or standing positions. In connection with this object I provide novel socket attachments at the vehicle floor for permitting the seat to be placed adjacent the controls or to be folded and stacked out of the driver's way.

It is a further object of my invention to provide a novel windshield defrosting system for a vehicle wherein hot air from beneath the hood is directed upwardly along the outer surface of the windshield.

Still a further object of my invention is to provide a novel delivery vehicle having a long wheel base and a relatively low rear compartment floor for accommodating long articles such as dresses and the like. This type of vehicle is especially designed for dry cleaning delivery service.

Further objects of my invention will presently appear as the description proceeds in connection with the annexed drawings in which:

Figure 3 is a side elevation looking at the inside of one of the body side assemblies illustrating the frame construction;

Figure 4 is a section taken along line 4—4 in Figure 3 illustrating the resilient means between the upper side panel and the frame;

Figure 5 is a section taken along line 5—5 in Figure 3 illustrating the manner in which the upper and lower side panels are joined and secured to the frame;

Figure 7 is an enlarged view in elevation illustrating the body construction at the upper front end of the vehicle body and further showing the modified hand brake lever and the side door control handles;

Figure 8 is a fragmentary rear elevation of the body of a vehicle constructed according to my invention and having a central rear door which is slidable upwardly and forwardly on tracks disposed adjacent the roof;

Figure 9 is a vertical section illustrating the manner in which the sliding door fits on the body when in closed position;

Figure 10 is a horizontal section illustrating the sliding door in closed position on the body and further illustrating the rear body panel structure;

Figure 11 is a fragmentary view in side elevation and partly in section illustrating the track assembly upon which the sliding rear compartment door operates, with the door shown in open position in full lines. Closed position of the door is indicated in dotted lines;

Figure 12 is a section of one of the sliding door tracks taken along line 12—12 in Figure 11;

Figure 13 is a fragmentary view looking from the rear of the body illustrating the brackets for supporting one of the sliding rear door tracks. The track is not shown in this figure for the sake of clarity;

Figure 14 is a fragmentary plan view partly in section of a latch for the rear compartment door;

Figure 15 is a fragmentary plan view partly in section illustrating one of the folding side doors of the vehicle with the combination door guide and water shed;

Figure 16 is a fragmentary view representing a section through the side door frame and door illustrating the guide arrangement;

Figure 17 is a fragmentary view in side elevation further illustrating the side door guide;

Figure 18 is a fragmentary enlarged end view partly in section illustrating the flexible fuel conduit leading from the side of the vehicle to the fuel reservoir;

Figure 19 is a fragmentary view illustrating a modified form of flexible fuel conduit;

Figure 20 is a front view of part of the front body wall at the engine side illustrating the battery support;

Figure 21 is a side elevation of the battery support of Figure 20;

Figure 23A is a fragmentary view illustrating the support for the right-hand end of an emergency brake operating shaft;

Figure 27 is a front elevation of the driver's seat also illustrating the floor socket for mounting the seat when the driver is operating the vehicle from a sitting position;

Figure 28 is a side view of the driver's seat of Figure 27;

Figure 29 is a section taken along line 29—29 in Figure 27 illustrating further the through aisle floor support;

Figure 30 is a section taken along line 30—30 of Figure 27;

Figure 31 is a section taken along line 31—31 of Figure 27;

Figure 32 is a section taken along line 32—32 of Figure 27;

Figure 33 is a fragmentary side view illustrating the brackets for storing the driver's seat out of the way when the driver operates the vehicle from a standing position;

Figure 34 is a front view of one of the brackets of Figure 33;

Figure 35 is a horizontal section taken through the bracket of Figure 33;

Figure 36 is a side elevation of a modified type of delivery vehicle according to my invention which has a long wheel base and a rear compartment designed for delivery of long vertical objects such as coats and dresses. The hot air stream for defrosting the windshield is also illustrated in this figure; and Figure 37 is a fragmentary view partly in section illustrating the manner of supporting the engine hood to permit passage of the windshield defrosting stream.

Figure 1:
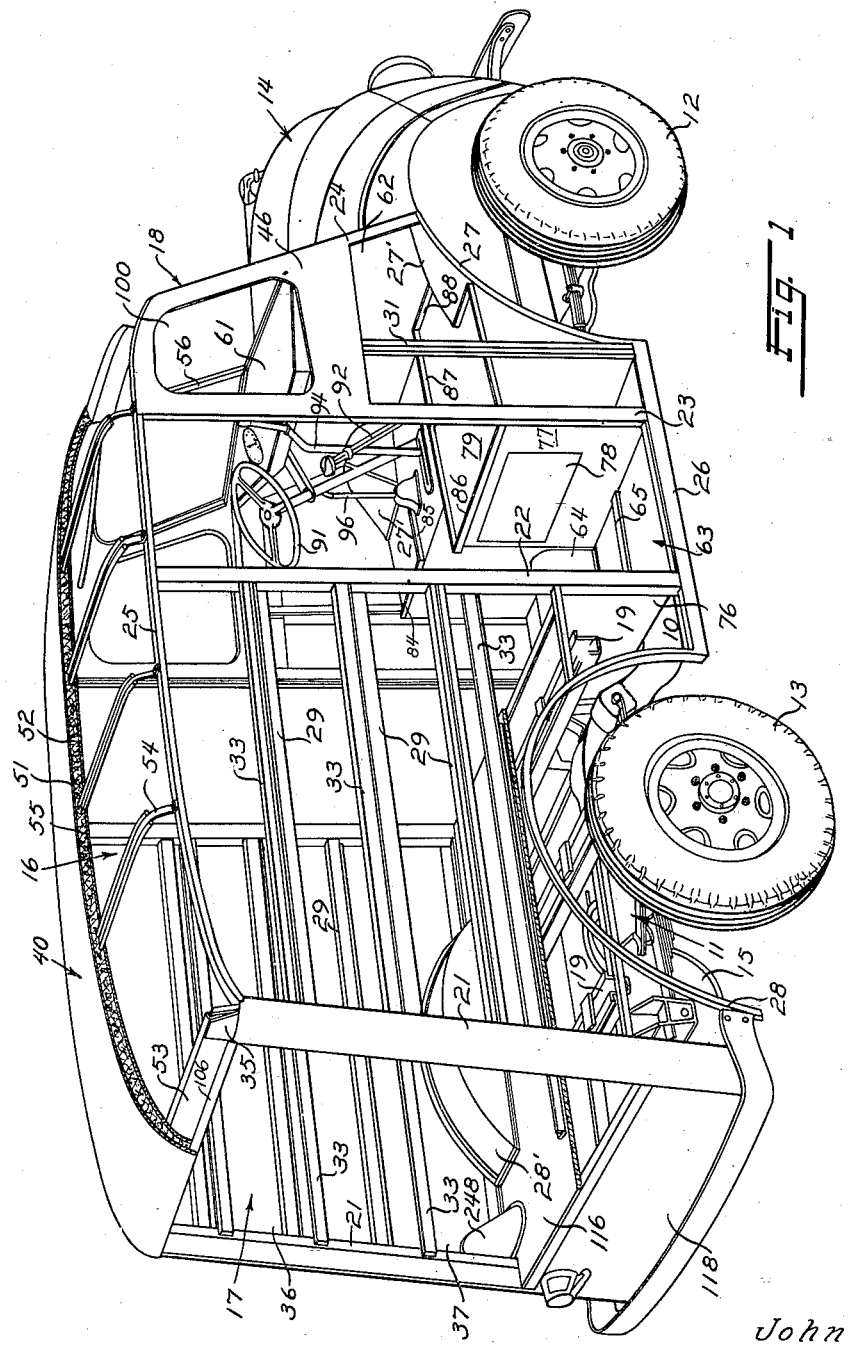
Figure 1 is a photographic view in elevation illustrating a vehicle constructed according to my invention with the side and rear doors omitted and the roof and side paneling partly cut away to show the body frame construction and the general arrangement of the body interior.

With reference to Figure 1, the vehicle of my invention comprises a chassis generally designated at 11 which is supported at the front and rear upon wheels 12 and 13, respectively. The engine E is mounted under hood 14 upon the forward end of the chassis and is disposed substantially wholly forwardly of the axle between the front wheels, substantially as illustrated in Figure 36 for a purpose later to be described. A fuel tank or reservoir 15 is mounted upon the chassis rearwardly of rear wheels 13.

Chassis 11 is provided with a drop portion 10 rearwardly of the transmission and a body generally designated at 16 is supported upon the chassis rearwardly of the engine. Body 16 comprises side frame assemblies, a roof assembly, side and rear doors and a novel front end arrangement as will be described below.

Novel methods and apparatus for building the separate body unit assemblies and incorporating them together to provide the complete body are disclosed in detail and claimed in my co-pending application, Serial No. 296,512, filed September 25, 1939.

*Side frame assemblies*

Body 16 is provided with opposite side frame assemblies 17 and 18 which are suitably secured, as by bolting, to the opposite ends of lateral body supporting crossbeams 19. Crossbeams 19 are secured rigidly in some suitable manner such as by bolting to the chassis 11. Side frame assemblies 17 and 18 (see Figures 1 and 3) are substantially identical and each preferably comprises a unit made substantially integral by welding before being assembled on the chassis.

Side frame assembly 17 (Figure 3) is provided with a plurality of substantially vertical members including a rear post 21, side door posts 22 and 23 and a front post 24. A slightly bowed top frame rail 25 extends substantially horizontally between the front and rear posts 21 and 24, respectively, and is secured firmly to the top ends of those posts as well as to the top ends of door posts 22 and 23. A lower body side rail 26, disposed substantially at the level of the drop portion 10, is secured to the bottom ends of door posts 22 and 23 and terminates in curved angle extensions 27 and 28 which are secured to the front post 24 and rear post 21, respectively. Frame angles 27 and 28 support the wheel housings 27' and 28', respectively.

A plurality of spaced horizontal panel braces 29 extend between the rear post 21 and door post 22. Forwardly of door post 23, a substantially vertical intermediate post 31 extends upwardly from lower rail 26 and is secured to a substantially horizontal panel brace 32 which extends between post 23 and front post 24. A plurality of inner horizontal braces 33 extend between rear post 21 and door post 22 at the inner side of the frame assembly. Frame assembly 17 is also provided with a rear bumper bracket 34 and a roof support bracket 35 which are secured at opposite ends of rear post 21.

Rearwardly of door post 22, side frame assembly 17 is provided with upper and lower body panels 36 and 37, respectively, which overlap at the joint illustrated in Figure 5. As shown in Figure 5, upper panel 36 is formed with an outwardly bent portion 38 which extends downwardly past the upper edge of panel 37 and the inner side portion 38 lies in full surface engagement with the outer side of panel 37. A suitable spring clip 41, designed to receive a horizontal moulding strip 42, is secured, as by welding, to the outer side of panel portion 38. If desired, a plurality of separate clip sections may be used in place of a long clip 41.

The inner surfaces of panels 36 and 37 are substantially in the same vertical plane and the joint therebetween is bridged by a longitudinal strip 43 which lies flush against the inner surfaces of both panels and is secured to lower panel brace 29 as shown in Figure 5. The two upper panel braces 29 are separated from upper panel 36 by strips 44 of a suitable resilient material such as sponge rubber or the like. As shown in Figure 4, upper panel braces 29 are preferably channel-shaped and provided with opposite lateral flanges 45. Strips 44 are disposed between each flange 45 and the inner surface of panel 36 and are preferably secured to flanges 45 in some suitable manner, such as by vulcanization or a suitable adhesive, before panel 36 is mounted on the side frame assembly.

Forwardly of door post 23, an upper front side panel 46 is secured upon the side frame assembly. Panel 46 is provided with a window opening 47. A substantially horizontal ledge 48, which is secured to the upper end of intermediate post 31, is secured at its opposite ends to posts 23 and 24 and serves as a window sill. A lower front panel member 50, shown in Figure 3 but removed in Figure 1, encloses the lower front end of the side frame assembly 17. The joint between panels 46 and 50 is preferably the same as that between panels 36 and 37 shown in Figure 5.

All of the posts, braces, rails, panels and other elements comprising frame assembly 17 are rigidly secured to each other as described above. Although any desired fastening means may be used between the elements, it is preferable to assemble the side frame in a welding jig so that all of the joints between the metal elements may be welded to secure tight permanent joints and provide a unitary integral side frame assembly.

Although the structural elements above described are of relatively light metal they are shaped and designed to withstand the various bending stresses to which they are subjected and all of the elements cooperate to form a truss in which the individual structural elements aid each other in resisting stresses which tend to warp or deform the side-frame assembly.

Panel 36 is preferably made of sheet metal and may have slight bends or other slight out of plane irregularities therein between its welded edges. It is partly the purpose of sponge rubber strips 44 to fill up any space which might exist, because of these irregularities, between panel 36 and braces 29. In this manner strips 44 prevent rattling between the panels and braces and it is not necessary to go to the trouble and expense of securing exactly shaped panels 36 since the expansion or compression of sponge rubber strips 44 compensates for slight panel irregularities and causes the panel and braces to fit snugly at all times.

Side frame assembly 18 is a substantial duplicate of side frame assembly 17 except that it is reversed so that, when the side frames are mounted on the body, both sets of horizontal braces 33 are inside the body.

Roof assembly

The roof assembly, designated at 40 in Figure 1, extends across the top edges of side frame assemblies 17 and 18 and comprises vertically spaced bowed substantially parallel plates or sheets of metal 51 and 52. The upper roof plate 51 extends from a lateral roof member 53 at the rear to a similar lateral roof member (not shown) at the front of the body. As shown in Figure 1, roof member 53 is secured at opposite ends to brackets 35 at the upper ends of rear posts so that roof member 53 is a body strengthening member. The lateral roof member at the front also serves as a body strengthening member.

Intermediate its ends, roof member 40 is provided with a series of bowed rigid lateral braces 54, the opposite ends of which are secured by any suitable means such as bolts to top frame rails 25. Sheets 52 comprise roof liner elements which are secured to braces 54 and braces 54 in turn are secured to suitable brackets (not shown) welded to roof plate 51. Braces 54 are preferably disposed below sheets 52 and are secured thereto in any suitable manner, such as by spot welding. The space between sheets 51 and 52 is preferably filled with a suitable heat insulation material 55 such as an asbestos mixture or the like.

Roof 40, comprising sheets 51 and 52 and the rigid lateral roof members and braces, is preferably made up as a unit and then bolted in place after the side frame assemblies and the cowl have been mounted on the body. A preferred manner of assembling roof 40 is to make it of three separate longitudinal sections which are assembled and made integral by welding before the whole unit is mounted on the body.

Windshield header

The windshield is of the V-type and slopes downwardly and forwardly from the roof and rearwardly and laterally from a central windshield brace 56. Above the windshield a header 57 extends between opposite sides of the body and is supported at opposite ends by posts 24. Header 57 is provided with a central storage compartment 58 for books and the like. Compartment 58 is enclosed at the top and front by the downwardly curving inner roof surface and its sides are formed by plates 60 which are secured in some suitable manner as by welding to header 57. If desired, a suitable door may be provided for the open end of compartment 58 but such is not necessary.

Instrument board

Figure 6:
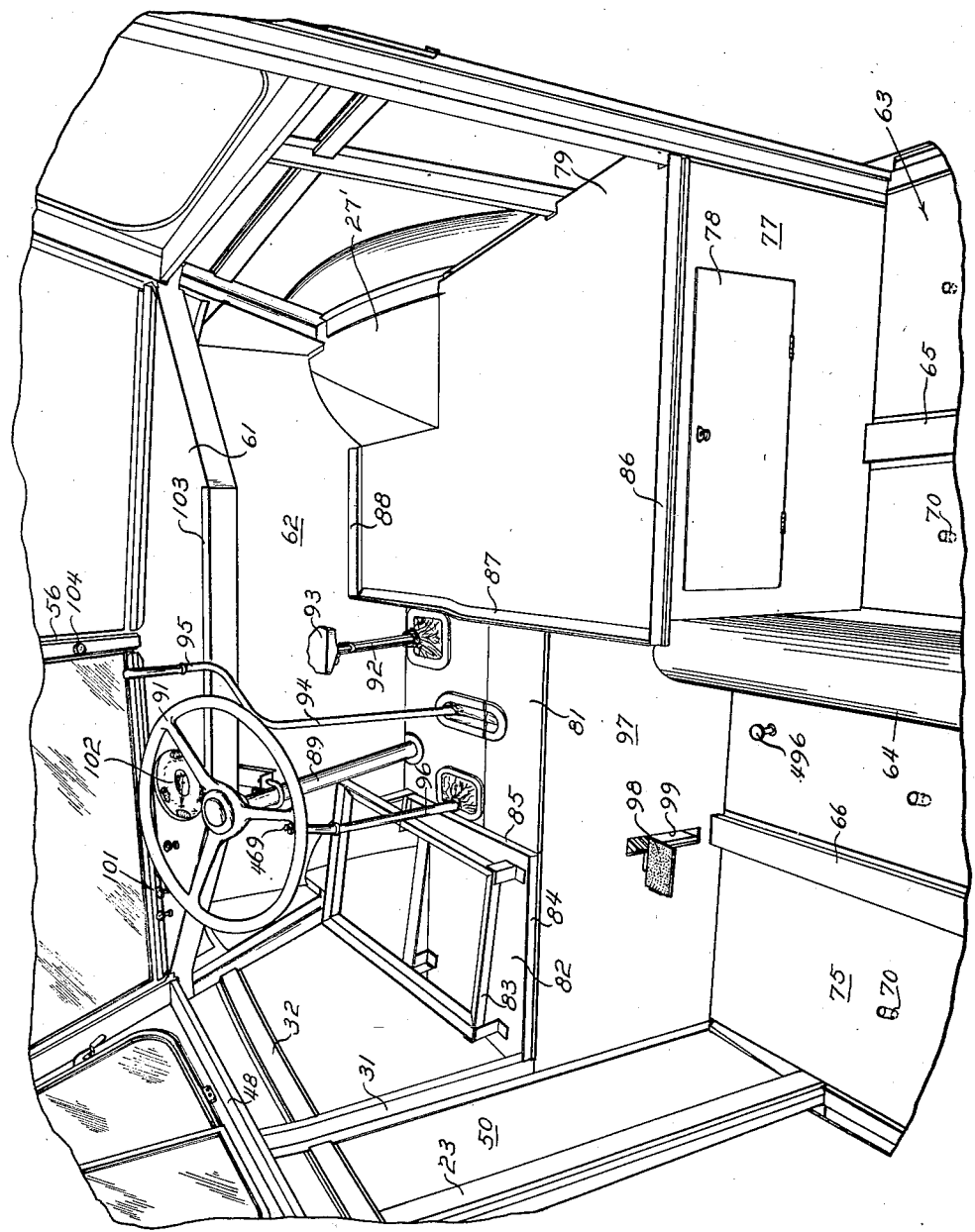
Figure 6 is an enlarged fragmentary view in elevation illustrating the control arrangements and the cargo platform at the front end of the vehicle body.

At the front end of the body a wide flat-topped instrument board, designated at 61, extends across the body and is secured at opposite ends to front posts 24 by some suitable fastening means (not shown) such as bolts, rivets or by welding (see Figures 1, 6 and 7). Instrument board 61 is rigid and sturdy and is designed to serve as a lateral body strengthening member.

The flat top of instrument board 61 is preferably horizontal. At the left side of the top surface of board 61 is grouped a bank of control buttons generally designated at 101 for manipulating the engine throttle, choke, lights, ignition switch and starter. Directly in front of the steering wheel an instrument cluster, designated at 102, is mounted on the top surface of board 61 and contains the speedometer, odometer, oil gauge, ammeter, gasoline gauge and motometer.

All of these controls and instruments cover less than one third of the top surface of the instrument board so that the remainder of that surface is available for use as a writing table where the driver may prepare his orders, bills or the like. A ledge 103 prevents books and papers from sliding rearwardly off the table surface to the floor when the vehicle is in motion. A suitable lamp 104 is provided on the inside of windshield brace 56 for illuminating the top surface of board 61.

Below the windshield and instrument board, a downwardly extending substantially vertical panel 62 extends across the body and is secured at opposite sides to front posts 24 by a suitable securing means such as bolts or welding or the like. Suitable insulation may be provided upon either surface of panel 62 ot prevent heat from the engine from being conducted to the interior of the body.

Through aisle arrangement

The vehicle body is provided with a low floor through aisle at that portion which is supported above drop portion 10 of the chassis. Side door openings, defined by door posts 22 and 23 and frame rails 25 and 26, are positioned at opposite ends of the aisle whose floor is generally designated at 63. Floor 63 extends between bottom rails 26 and is provided intermediate its ends with a raised housing portion 64 enclosing the drive shaft. Floor 63 is further provided with raised portions 65 and 66 where it traverses the longitudinal chassis members (see Figures 1 and 6).

Floor 63 is preferably made up of three sections, one of which is the housing 64, and the other two of which extend laterally from opposite sides of housing 64 to the door openings. Attention is especially called to Figures 27 and 29 in which the floor supporting members are best shown. A lateral seat socket supporting web 67 is provided with a flange 68 secured, as by bolts 69, to the inner side of a main longitudinal channel-shaped chassis member 11'.

Drive shaft housing 64 preferably comprises a generally channel-shaped section of relatively heavy gauge sheet metal provided with oppositely extending lateral floor supporting flanges 74 as shown in Figure 27. Floor sections 75 extend from flanges 74 to rails 26.

Each flange 74 is provided with a plurality of apertures spaced along the length of tunnel 64 and, as shown in Figure 27, each floor section 75 is provided with a plurality of similar apertures where it overlaps its respective flange 74. An angle member 71 has a horizontal leg secured as by welding to the lower surface of flange 74 and has a depending leg secured as by welding to the free end of web 67. Angle 71 is apertured to allow passage of a bolt 73 extending through aligned apertures in floor section 75 and flange 74. The threaded end of bolt 73 is received within a tapped block 72 welded to the horizontal leg of angle 71 as shown in Figure 29.

At all of the other apertures along flanges 74, block 72 is secured as by welding directly to the bottom surface of flange 74 since only one angle member 71 for connection with the web 67 is provided. When bolts 73 are tightened, floor sections 75 are securely clamped to tunnel 64. Suitable fastening means such as screws may also be provided if desired for securing portions 65 and 66 of the respective floor sections 75 to chassis members 11'. The outer edges of each floor section 75 are bent upwardly and outwardly over the top surfaces of rails 26 which lie in substantially the same plane as the top surfaces of chassis members 11'. Floor sections 75 are then rigidly secured to rails 26. Suitable mats are provided upon floor sections 75 to bring the floor level even with portions 65 and 66 and rails 26 to prevent the operator from being tripped thereby. The distance from floor section 75 to the ground or curb is but a single short step.

At the rear of the aisle, a rigid vertical cross panel 76 (Figure 1), preferably welded to housing 64, extends between opposite side door posts 22 and is preferably secured thereto by bolts or some other suitable fastening means (not shown). Panel 76 is relatively heavy and serves as a lateral body strengthening member.

Supported upon the front of the body floor to the right of housing 64 is a storage compartment 77 for luggage, chains, tools and the like provided with a suitable door 78 (Figure 6). The flat top wall 79 of compartment 77 extends forwardly to the front body panel 62, being cut away at one corner to accommodate the right front wheel housing 27'. Wall 79 comprises part of a cargo platform which extends across the front of the body and also includes contiguous top walls 81 and 82 which lie in substantially the same plane as wall 79. Wall 81 is provided with a series of apertures through which the grouped vehicle control mechanisms extend upwardly from the chassis as will later be described. Wall 82 extends laterally from wall 81 to left front side panel 50 and forwardly to front body panel 62.

An elevated skeleton rack 83 is rigidly secured to the top surface of wall 82. In the illustrated form of my invention in Figure 6, rack 83 is designed to support a case of milk bottles and slopes downwardly and rearwardly to aid easy insertion and removal of the case at the rack. Milk cases, especially in the summer, are usually iced and the melted waste liquid from the ice often drains to the floor of delivery vehicles causing the floor to become dangerously slippery. In my vehicle, end and side edge ridges or dams 84 and 85, respectively, are provided for preventing liquid from draining from wall 82 to the vehicle floor. Similar suitable ridges or dams 86, 87 and 88 are provided at the inner edges of wall 79 for the same purpose. These dams or ridges also serve to hold the cases in place on walls 79 and 82. Furthermore, in order to drain liquid which has been accidentally spilled on the floor I provide one or more drain pipes 70 (see Figure 6) for leading such liquid to the ground below the vehicle.

All of the hand operated vehicle controls extend from the operating mechanism on the chassis upwardly through grouped apertures in wall 81. These controls include a steering column 89 at the top of which is a steering wheel 91; a transmission lever 92 having a hand throttle control 93; a service hand brake lever 94 which is elongated and bent outwardly and upwardly at 95 to pass closely adjacent to the periphery of the steering wheel so that the brake may be applied upon only a slight shift of the hand from the steering wheel; and an emergency brake lever 96 which is located behind and slightly to the left of the steering column instead of being positioned to the right of transmission lever 92 as in the conventional automobile.

With special reference to Figure 6, left floor section 75 extends forwardly from the through aisle to a front panel 97 which is disposed a substantial distance forwardly of the left door opening and supports the front end of tunnel 64. At its forward end floor section 75 is supported upon a rearwardly extending flange 97' at the bottom of panel 97 (see Figure 22). Thus a low floor compartment defined by panel 97 at the front, side panel 50 at the left and luggage compartment 77 and housing 64 at the right is provided forwardly of the through aisle. The inner side wall of storage compartment 77 is spaced beyond tunnel 64 as above described to permit free movement of the driver's body when he is within this low floor compartment. In this compartment the driver may stand at the controls and be completely out of the way while a helper passes easily across the through aisle. A combination clutch and brake operating pedal 98 extends through an aperture 99 in panel 97 into the driver's compartment. With the driver's compartment so forwardly disposed with respect to the through aisle there is no danger of tripping over this pedal while passing through the aisle.

From the above it will be seen that the driver may stand in his driver's compartment completely out of the through aisle when driving the vehicle from stop to stop. If there is a helper, he can pass entirely through the aisle and get off at either side of the vehicle without interfering with the driver. Furthermore, the driver has better road vision during driving periods since he is very close to the front end of the vehicle.

The grouped control arrangement above described results in increased efficiency of operation with all controls available to one hand of the driver while the other is maintained on the steering wheel. Location of the hand service brake adjacent the steering wheel periphery is especially advantageous in standrive vehicles because no stooping or bending is required to locate and operate the service brake lever of my invention.

Grouping of the controls also aids in permitting additional cargo space at the front of the vehicle. As shown best in Figures 1 and 6, panel 62 is disposed adjacent the rear of the motor and substantially above the front axle. The forward cargo compartment within the body extends all the way forwardly to that panel and substantially twice as much cargo space as is found provided in prior art vehicles of this type is now available forwardly of the through aisle. For example, the milk delivery truck of the prior art generally supports only two exposed cases of milk forwardly of the through aisle. My platform will accommodate three exposed cases of milk at the right on wall 79 and one exposed case at the left on rack 83.

Provision of this additional front cargo space is especially important in delivering milk and other perishables which must be iced in that it permits early morning delivery from a large number of cases at the front in the cool of the day, while the rear compartment containing the bulk of the load can be kept closed during that time. A considerable saving in refrigerant is effected in this manner.

The cargo platform forwardly of the through aisle is preferably of such height that the driver or helper does not have to bend appreciably when he is picking up articles therefrom, and any article on the platform can easily be reached from the through aisle. Furthermore, as explained above, the controls are so grouped and disposed as not to interfere with a man passing through the aisle or reaching for an article on the cargo platform.

*Rear compartment wall and door structure*

Figure 2:
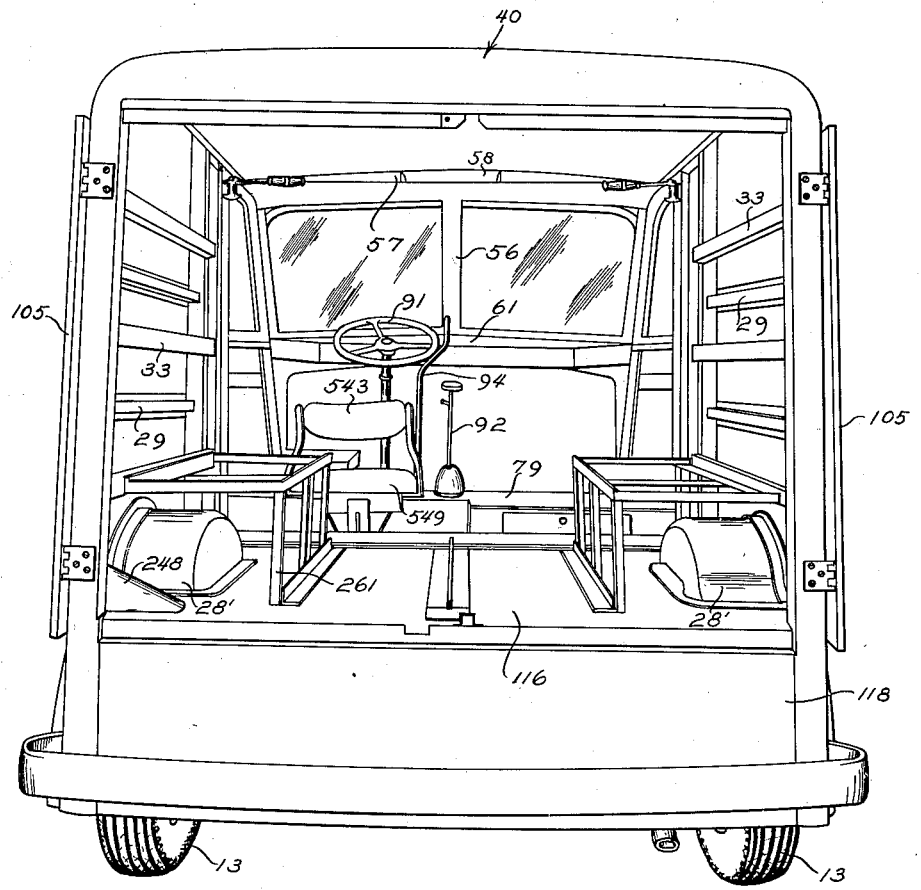
Figure 2 is an end elevation of the vehicle of Figure 1 illustrating especially the rear body storage compartment.

The vehicle illustrated in Figure 1 may be optionally equipped with the side hinged rear compartment doors 105 shown in Figure 2, but preferably the sliding rear compartment door structure shown in Figures 8–14 is employed.

Referring to Figures 1, 8 and 11 the roof assembly 40 curves downwardly at the rear end, as described above, is provided with laterally extending angle member 53 which is preferably bolted at opposite ends to roof support members 35 attached to posts 21. As shown in Figures 1 and 11, member 53 is provided with a substantially vertical rear flange 106. Roof member 51 extends along the outer surface of flange 106 and is bent inwardly at 107 to extend a substantial distance along the lower surface of member 53. Sheet 51 and angle member 53 are rigidly secured together, preferably by welding. A substantially J-shaped lateral strip 108 of thin sheet metal is secured upon the lower surface of sheet 51 at its inwardly bent portion and extends laterally of the vehicle body to form a gutter to prevent moisture from the roof or above from streaming down the rear surface of the body. An angular bracket 109 also extends along the entire width of the body and is preferably secured as by welding to the bottom surface of strip 108. Bracket 109 is provided with a vertically extending inwardly facing strip 111 of resilient material, such as a strip of rubber vulcanized thereto, for a purpose later to be described.

When a sliding door is used, such preferably occupies only about half of the rear body surface and flanking panels 112 are provided at each side thereof to completely enclose the rear of the body. Left-hand panel 112 is illustrated in Figures 8–10 and angle strips 113, 114 and 115 are provided for securing panel 112 to the roof member 53, left rear post 21 and rear compartment floor 116, respectively. Angle strips 113, 114 and 115 may be secured to members 53, 21 and 116, respectively, by any suitable securing means but preferably sheet metal screws are used because it is obviously advantageous to provide for removal of panels 112 in case a different rear door structure is desired. Panel 112 is provided with a resilient vertical edge lip 117 extending over and pressing against the adjacent surface of post 21 to provide a seal against the entrance of moisture and the like.

As shown in Figure 9, a bracket 116' is secured to the rear under surface of floor 116 and extends rearwardly and downwardly therefrom to support a lower rear body panel 118.

The door adjoining edges of each panel 112 are provided with sealing strips 119, preferably of sheet metal. As shown in Figures 8, 10 and 14, strip 119 is secured upon the outer surface of panel 112 by suitable fastening means such as screws 121 or the like, then bent inwardly at 122 along the inner edge of panel 112 and then bent laterally away from panel 112 to provide a vertical support flange 123. A cushion strip 124 of some fabric and rubber or similar resilient material is secured to the rear face of flange 123 by split rivets 125 or the like for a purpose later to be described. As shown in Figure 11, flange 123 terminates in an inwardly curved portion 126 a substantial distance below the top of panel 112 for a purpose later to be described.

A pair of parallel tracks 127 extend forwardly from the upper inner edges of panels 112 substantially along the inner side of the rear compartment roof. Each track 127 is substantially U-shaped and is supported with its open side facing the other track. At its inner end each track 127 is secured as by welding in a cooperating socket 127' in a bracket 128. Bracket 128 in turn is secured, preferably by welding, to the inner roof surface just below one of the arched lateral roof braces 54 so that the inner ends of both tracks 127 are effectively supported upon the same roof brace 54.

At the rear end of each track 127 the upper and lower track surfaces flare vertically to form lips 129 and 131 which abut against end plates 132 positioned along the inner surface of panel 112 above the upper ends of flanges 123. Suitable securing means such as bolts 133 and 134 pass through the upper ends of strips 119, panel 112, plates 132 and lips 129 and 131, respectively, as shown in Figure 11 and thus rigidly support the rear end of each track 127.

Intermediate its ends, each track 127 is preferably supported from an intermediate lateral roof brace 54 by an adjustable bracket 135. Bracket 135 comprises a generally vertical tapered plate 136 having a horizontal flange 137 secured as by welding at the inner roof surface below intermediate brace 54. Bracket 128 and plate 136 are, therefore, rigidly secured to the roof braces in substantially the same manner. Adjacent its lower end, plate 136 is provided with a pair of vertically aligned horizontally extending slots 138 and 139. A second plate 141 having vertically aligned vertical slots 142 and 143 is secured against plate 136 by means of bolts 144 and 145 which pass through slots 138 and 142 and 139 and 143, respectively.

The lower end of each plate 141 is bent rearwardly and downwardly at 146 and lies along the top surface of each track member 127, being rigidly secured thereto in any suitable manner such as by welding. Bracket 135 can therefore be universally adjusted to keep track 127 from sagging or to compensate for warped portions of the track. The mated slots in plates 136 and 146 further permit easy assembly and adjustment of these members.

A sliding rear door 147 is shown in open position in full lines in Figure 11, and in closed position in dotted lines in Figure 11 and full lines in Figures 8–10. Door 147 preferably has a central window 148 (Figure 8) and centrally disposed internal and external handles 149 and 151, respectively, (see Figure 9) so that it may be raised either from the rear of the vehicle or from inside the rear compartment.

At opposite upper edges, door 147 is provided with a pair of generally L-shaped brackets 152. One leg 153 of each bracket 152 is secured to the outer surface of door 147 as by screws 153' and the other leg 154 extends past the side edge of the door into the rear compartment. Each leg 154 carries thereupon a cylindrical projection 155 which fits within the adjacent track member 127 and serves to both guide and support door 147 upon the rear of the body. Door 147 is provided with a pair of wear strips 156 at opposite sides and when the door is closed, these wear strips cooperate with cushion strips 124 to effectively seal the door edges. The top of the door is sealed in closed position by engagement with resilient strip 111.

Door 147 is raised to fully open position by pulling upward on either of handles 149 or 151. This causes door 147 to simultaneously pivot outwardly about projections 155 and slide forwardly into the rear compartment along tracks 127. Resilient means are provided for holding door 147 in fully open position. The bottom leg of each track 127 is provided with an aperture 157 through which extends the bowed portion 158 of a compressed flat spring 159 whose opposite ends are fixed upon the under side of track member 127 by any suitable means such as bolts 161.

Springs 159 are of such stiffness as to prevent projections 155 from accidentally sliding rearwardly past bowed portions 158 once the door is in fully open position. Springs 159 are sufficiently resilient so that when the operator pulls on door 147 projections 155 are forced past bowed spring portions 158 which are forced out of the tracks through apertures 157. Springs 159 are temporarily forced out of the tracks in the same manner, of course, when the door is being raised to fully open position.

When door 147 is in closed position, a suitable latch such as that shown at Figure 14 is preferably employed to prevent accidental opening of the door. A pair of brackets 162 are secured, as by bolts 163, to the outer surface of panels 112 adjacent opposite edges of the lower end of door 147. A latch 164 is pivotally mounted upon each bracket 162 to swing in a generally vertical plane. Each latch 164 is provided with a locking portion 165 fitting within a groove 166 in a cooperating latch member 167 secured adjacent thereto upon the outer surface of door 147 by bolts 168 or some other similar fastening means. At its free end each latch 164 is bent rearwardly to provide a convenient handle portion 169 so that the operator's hand will easily fit between door 147 and handle 169 when he manipulates the latch.

Use of sliding rear compartment doors of the type described above results in a practical saving in refrigeration costs when perishables or the like are being delivered because the rear compartment is effectively sealed to keep cool air in and keep dust and hot air out of the body.

Folding side doors

The vehicle is provided with double folding side doors which are illustrated in Figures 15–17. Each door is designed to close the side door opening defined by door posts 22 and 23 and side frame rails 25 and 26 when in unfolded or closed position, and to be folded and swung back against the outer side of the body as shown in dotted lines in Figure 15 when in open position.

Each side door comprises a front section 171 and a rear section 172 interconnected by a suitable hinge 173 which extends the entire distance from top to bottom at the adjoining edge portions of each section. The rear section 172 is provided at its rear edge with a suitable hinge portion 174 which cooperates with a hinge portion 175 secured to the front side of door post 22. Hinge portions 174 and 175 also extend the entire length of the door from top to bottom. In this manner it will be seen that rear door section 172 is hinged to the body frame door post while front section 171 is hinged to and supported by its hinged mounting on the rear section.

Adjacent hinge portion 174, rear door section 172 is provided with a rigid arm 176 which projects substantially normal to the door section into the interior of the body. Arm 176 may be riveted to a portion of door section 172 as indicated at 170 in Figure 15, or may be welded or bolted thereto as desired. At its free end arm 176 is provided with an upstanding hollow boss 177 in which is rotatably secured the downwardly extending end portion 178 of rod 179. Rod 179 extends forwardly along the inner side of the door opening and, adjacent the front door post, is provided with a threaded end 181 upon which is fitted a threaded collar 182. Lock nut 183 maintains collar 182 in any desired position along the threaded portion 181.

Collar 182 is bifurcated at its front end to pivotally receive one end of a short lever 184. The other end of lever 184 is non-rotatably secured to a vertical post 185. Post 185 is rotatably supported in a hollow boss 186 at the inner end of a rigid ribbed bracket 187 which is firmly secured, as by bolts 188, to front door post 23. As shown in Figures 7 and 15 an operating lever 189 is non-rotatably secured to post 185 immediately below lever 184 and is provided with a suitable handle 191. With this arrangement left door handle 191 is in a convenient position above and forwardly of the driver's head and to the left of the steering wheel so that it is easily available to a driver whether he is in the through aisle or in the driving compartment. Door handle 191 at the right side of the body is similarly disposed.

With reference to Figures 16 and 17, top frame rail 25 has secured thereto as by welding a channel-shaped strip 192 which extends along the top of the door opening between posts 22 and 23. A flat plate 193 is supported along the bottom surface of strip 192. Plate 193 is narrow at its forward end but increases in width toward the rear so that it projects a substantial distance outwardly from the body. A downwardly extending guide rail 194 is secured, preferably, by welding, to plate 193. Guide rail 194 extends along the bottom surface of plate 193 adjacent its outer edge and after passing the rear edge of plate 193 curves inwardly and forwardly to provide a flat end portion 195 which is secured to the panel 36 and post 22 by bolts 196.

Angle strip 197 is supported along the bottom surface of plate 193 just above the door. Preferably sheet metal screws 198 are provided for securing both plate 193 and angle strip 197 upon strip 192. Angle 197 is provided with an outwardly facing sealing strip 199 of rubber or the like preferably vulcanized thereto for a purpose later to be described.

A plate 201 is secured preferably by bolts 202, flush upon the forward outer surface of door section 171 adjacent the forward end of the guide rail and is provided with an outwardly projecting hollow boss 203. A cylindrical guide block 204 is provided with a shoulder portion 205 in bearing engagement with the top surface of boss 203 and a downwardly extending reduced end portion 206 fitting rotatably within boss 203. Block 204 is slotted at 207 to receive guide rail 194.

Door section 172 is provided with a projecting bumper 208 of rubber or some suitable material at its inner surface and a similar bumper 209' at its outer surface, and panel 36 is also provided with a similar bumper 209 for a purpose later to be described. A spring anchor plate 211 is secured by bolts 212 at the inner side of rail 25. Plate 211 is provided with an inwardly extending lug 213 which is apertured at 214 to receive one end of a tension spring 215. The other end of spring 215 is secured to lever 184 adjacent its pivotal connection to collar 182. When the door is in closed position as shown in Figure 16, the forward end of front section 171 fits snugly against a resilient striker strip 216 of sponge rubber or the like seated in a longitudinal depression 217 in post 23.

Starting with the door in closed position as shown in full lines in Figure 16, operation of the door opening mechanism will now be described. The driver standing in the driver's compartment reaches up and pulls door handle 191 toward himself thus rotating operating lever 189, post 185 and lever 184 in a clockwise direction. Rotation of lever 184 pulls rod 179 forward and, through the toggle joint at 177, 178 and arm 176, causes rotation of rear door section 172 outwardly about the hinge at 175 as a pivot. After the operating handle has been pulled through about a quarter of a turn, the door is about half open and rod 179 and the toggle joint will have reached the limit of forward motion, but momentum gained by the door during its initial movement described above will carry it over the toggle center toward the position shown in dotted lines in Figure 16. During the last half of the opening movement of the door rod 179 is traveling rearwardly assisted by the pull of spring 215; and handle 191, released by the driver, will return approximately to its initial position so that it will not interfere with the driver's exit from the vehicle.

Rear door section 172 simply pivots about the hinge at 175 but the front door section 171 pivots about hinge 173 and is caused by guide block 204 to follow guide 194 as the door swings open. This causes door section 171 to swing clockwise about hinge 173 as the door opens with the result that the door sections are folded with their inner surfaces facing each other when fully open position, shown in dotted lines in Figure 15, has been reached. Bumper 208 absorbs the impact when door sections 171 and 172 come together in folded relation while bumpers 209 and 209' absorb the impact caused by the door swinging back against the outer surface of the body.

When it is desired to close the door, handle 191 is again pulled toward the interior of the vehicle for about a quarter of a turn and the door swings forward about hinge 175 with an unfolding motion exactly opposite to its folding motion while opening. Impact of the front edge of door section 171 against door post 23 when fully closed position is reached is absorbed by sponge rubber striker strip 216.

The folding side door mechanism described above is used at each door opening at opposite sides of the through aisle. The operating handles are located near the forward upper corner of the vehicle body so that there is no danger of the operator striking his head thereagainst during his movements in the driver's compartment and along the through aisle.

The door guide arrangement is simple and sturdy. Plate 193 performs the double function of being a guide rail support and a water shed member for protecting the door opening. The size of plate 193 is generally determined by the size of the door sections since its outer edge is designed to extend over and protect the guide rail mechanism at all times.

This novel door operating and guiding mechanism is disclosed and claimed in my co-pending divisional application, Serial No. 279,970, filed June 19, 1939.

*Fuel tank and flexible conduit*

With reference to Figures 1 and 18, the fuel tank or reservoir 15 is mounted on the chassis beneath the rear compartment floor 116. Across the rear of the chassis, a rigid lateral chassis member 218 extends between the ends of the channel-shaped longitudinal chassis members 11', being securely bolted or otherwise suitably fastened thereto. A web 219 extends inwardly from each channel member 11' and is secured thereto by bolts 221 passing through member 11' and web flange 222. Webs 219 are oppositely disposed and are secured by a plurality of bolts (not shown) to opposite ends of a rigid lateral chassis member 223 which is flanged at its upper edge at 224. In addition to being secured to webs 219, chassis member 223 is preferably attached at its ends to chassis members 11' by bolts 225.

Reservoir 15 is a hollow metal tank of suitable capacity and is supported in the space between lateral chassis members 218 and 223 by means of upper and lower straps 226 and 227 which pass around the top and bottom surfaces of tank 15, respectively. The rear end of strap 226 is flanged at 228 and secured to the top of chassis member 218 by a suitable fastening means such as a bolt 229. The rear end of strap 227 is secured to the bottom flange 231 of chassis member 218 by a suitable fastening means such as bolt 232. The front ends of straps 226 and 227 are similarly secured to chassis member 223 so that tank 15 is enclosed by chassis members 218 and 223 and embracing straps 226 and 227 at each end of the tank.

Looking from the rear as shown in Figure 18, tank 15 is provided at its left end with a head 233 having a circumferential fluid-tight joint 234 with the tank walls. Head 233 is apertured at 235 above the chassis member 11' and an internally threaded flanged collar 236 is secured, as by rivets 237, to the outer surface of head 233 surrounding aperture 235. A hollow rigid pipe member 238, threaded externally at its inner end to fit within collar 236, extends laterally from aperture 235 beyond chassis member 11'. The joints between head 233, collar 236 and pipe 238 are preferably sealed by gaskets or other suitable devices to make them fluid tight.

As shown in Figures 3 and 18, the lower left body side panel 37 is provided with an aperture 239. A rigid pipe casting 241 having a flange 242 abutting against the inner surface of panel 37 is secured to panel 37, as by bolts or welding. Mouth 243 of casting 241 projects externally of the panel and is provided with screw threads or other suitable means for mounting an ordinary fuel tank cap 244. A flexible conduit 245 of Duprene, rubber, rubber and fabric or any suitable material treated to resist chemical action by the fuel extends between pipe 238 and casting 241. Suitable pipe clamp means designated at 246 are preferably fastened about both ends of conduit 245 to provide fluid tight joints.

Conduit 245, in passing from the fuel tank to the panel aperture, extends upwardly through an aperture 247 in floor 116 of the rear compartment. As shown in Figures 1 and 18, the flexible conduit is provided with a rigid sheath or cover 248, preferably of sheet metal, bolted to the floor at 249 about aperture 247.

In order to provide an outlet for air from the tank when fuel is being poured in through conduit 245, the tank is provided with an aperture 251 at its top. A suitable rigid pipe fitting 252 having a lateral extension 253 is secured above aperture 251 and a suitable conduit 254 extends between extension 253 and a lateral outlet 255 on casting 241 just inside panel 37. Floor 116 is recessed at 256 to accommodate fitting 252.

Instead of the fuel conduit above described it is within the scope of my invention to use an elongated formed metal tube 257 in place of casting 241 and conduit 245. Such a tube as shown in Figure 19, is supported at one end within a rubber grommet 258 secured within aperture 239 and would extend externally therefrom to receive cap 244. At its other end tube 257 is connected by means of a short sleeve 259 of Duprene or some other suitable material to pipe 238. A suitable air outlet similar to that disclosed in Figure 18 is also provided.

In the above described construction the fuel tank is rigidly supported upon the chassis and is provided with a convenient fuel admitting opening closed by cap 244 at the side of the body. Since conduits 245 and 259 are flexible, relative movement between the body and the chassis does not place appreciable strain on the fluid tight conduit joints but instead that movement is absorbed by twisting or stretching of the conduit.

*Rear compartment floor*

With reference to Figures 2 and 18, rear compartment floor 116 extends entirely across the body behind the through aisle and is provided with oppositely disposed cut-away portions above the rear wheels. These cut-away portions are enclosed by wheel housings 28' which are secured to floor 116 and side panels 37 by welding or in some other suitable manner. Since housings 28' project a substantial distance above the floor level it is preferable to provide suitable elevated case racks 261 above these housings so that the cargo may be evenly stored.

Floor 116 is of novel construction and comprises at least five superposed layers of plywood 262 secured together by glue or other suitable means. The upper surface of the plywood floor is completely covered by sheet metal strips or sheathing 263 which prevents heavy and pointed objects from injuring the wooden flooring.

Cover 248, above described, serves as a floor portion and prevents road splash and dust from entering the body from beneath; and also protects the flexible fuel conduit against injury from heavy cargoes as well as improving the internal appearance of the rear compartment.

The plywood floor above described is light and inexpensive but at the same time it is stronger than an ordinary wooden floor. Furthermore, the plywood provides excellent insulation against heat from the chassis and the pavement below and this feature further reduces the cost of refrigeration in such a vehicle.

*Battery support*

In standrive vehicles there is no fixed front seat station beneath which the battery may be located as in the ordinary automobile. As shown in Figures 20 and 21 a battery support is provided beneath the engine hood at the front side of the dashboard 264 which is supported forwardly of panel 62 upon intermediate vertical front body posts 265, one of which posts is shown in Figure 20.

A pair of forwardly extending parallel vertical plates 266 and 267, provided with bolt receiving flanges 268 and 269, respectively, are secured to post 265 and dash 264, respectively, preferably by bolts designated at 271. A substantially U-shaped strip 272 of sheet metal or the like has its opposite upwardly extending legs secured to the inner surfaces of plates 266 and 267, preferably by spot welding. Above member 272 a flat generally rectangular collar 273 is supported from the inner surfaces of plates 266 and 267. The lower side edges of collar 273 abut the upper edges of the legs of strip 272 and collar 273 is preferably spot-welded to plates 266 and 267. In this way battery enclosing members 272 and 273 are made integral with supporting plates 266 and 267.

Collar 273 is split at its forward end and provided with forwardly extending flanges 274 and 275 which are apertured to receive a bolt 276 extending between the flanges. Bolt 276 is provided with a suitable nut 277 and a lock washer 278.

The battery 279 is lowered into its support from above until its bottom rests upon the inner surface of strip 272. In this position collar 273, with bolt 276 loose, surrounds the upper portion of the battery. Tightening of nut 277 causes collar 273 to be drawn tightly about the battery and lock washer 278 prevents accidental release of nut 277 so that battery 279 is firmly and securely mounted upon the front face of dashboard 264.

Battery 279 is preferably grounded to the frame by a suitable strap (not shown) connected to cowl 281. Positioning of the battery beneath the hood insures its frequent inspection by service men since it is conveniently available, whereas batteries under the front seats of ordinary automobiles are usually uninspected for long periods. Furthermore, battery 279 can be quickly made removable by loosening only one nut 277.

*Clutch and service brake operating mechanisms*

Figure 22:
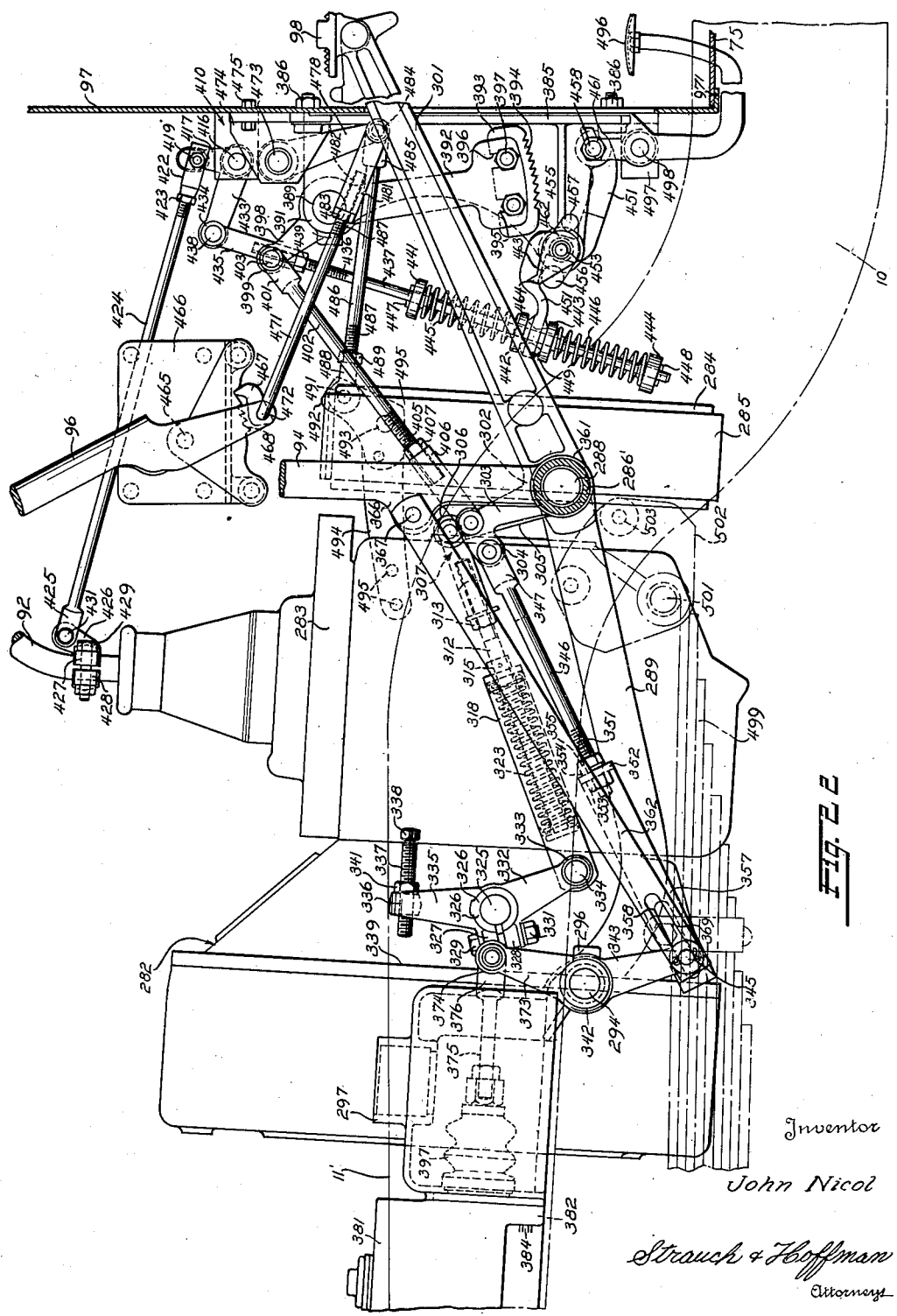
Figure 22 is a side elevation illustrating the clutch and brake control linkage.
Figure 23:
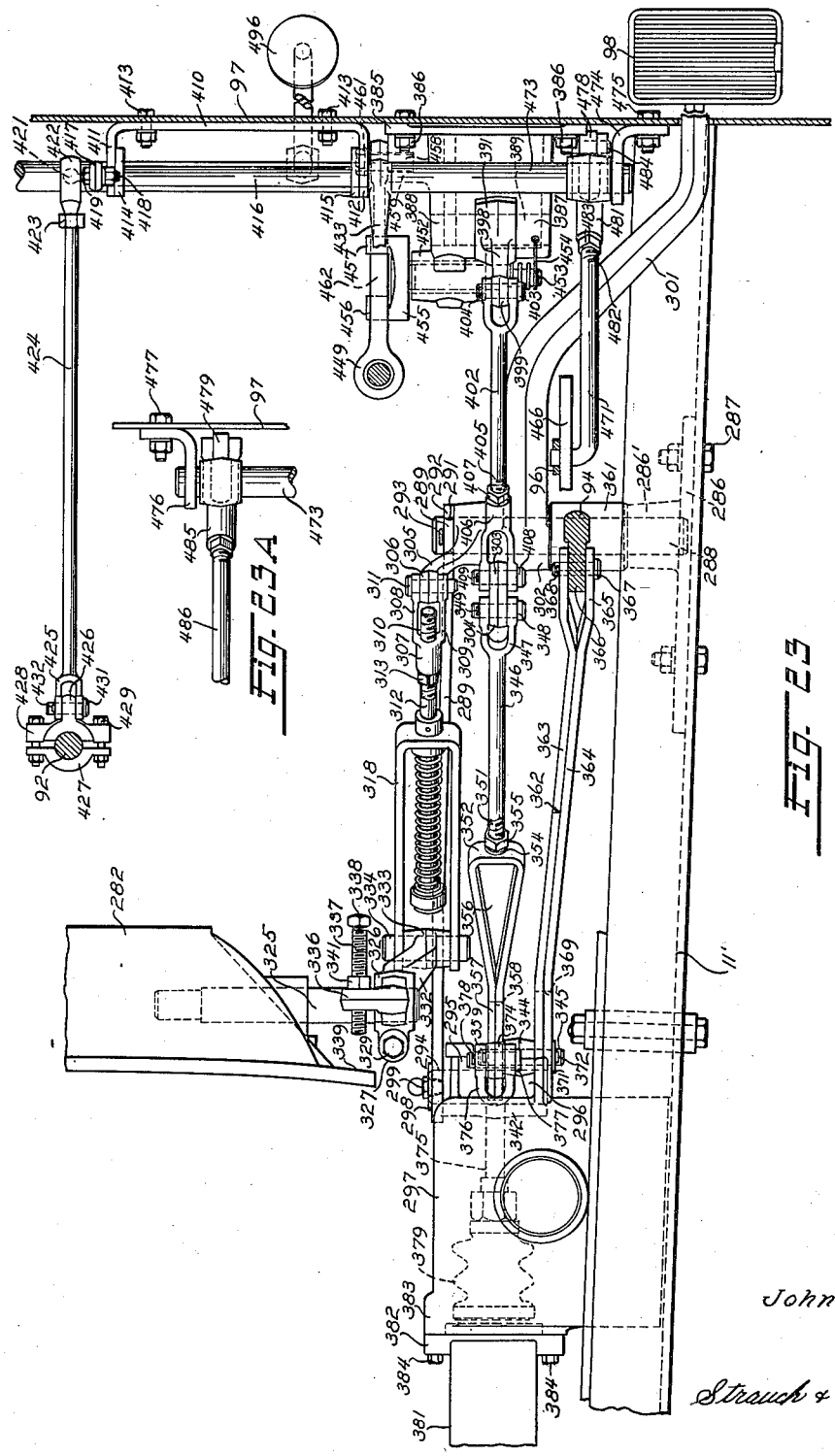
Figure 23 is a plan view of the control linkage of Figure 22.

With reference to Figures 22 and 23 the clutch housing 282 is disposed between the engine (not shown) and the transmission assembly 283 and a suitable transmission shaft (not shown) delivers power from the transmission to the rear driving wheels. The transmission shaft is provided adjacent the transmission housing with a drum 284 encircled by a brake strap member 285. The clutch, transmission and brake may be of any desired construction and this invention is concerned mainly with the provision of improved controls for these elements.

Left longitudinal chassis member 11' is channel-shaped and is provided with a support bracket 286 which is secured by any suitable means such as bolts 287 along the inner face of the vertical web of member 11'. Most of bracket 286 is omitted in Figure 22 for the sake of clarity. Bracket 286 is provided with an integral hollow boss 286' which forms a socket for non-rotatably receiving one end of an inwardly extending pin 288. Pin 288 may be made integral with bracket 286 but preferably it is separate therefrom and made of hardened steel.

The outer surface of pin 288 is preferably machined since pin 288 is designed to serve as a pivot member upon which clutch and brake control levers are rotatably mounted as will later be described. A bracket 289 extends parallel to member 11' and is provided with an aperture through which extends the inner end of pin 288. Pin 288 is grooved at 291 and bracket 289 is provided with a suitable locking tongue 292 fitting within the groove to secure pin 288 non-rotatably upon bracket 289. To further insure against bracket 289 moving axially beyond the inner end of pin 288 a suitable cotter key 293 is provided adjacent the end of pin 288.

Bracket 289 is bent downwardly to clear the clutch operating levers, later to be described, and is apertured to fit snugly over the inner end of a fixed bearing pin 294. Pin 294 is non-rotatably supported within a pair of downwardly extending apertured lugs 295 and 296 which are integral with or rigidly attached to the left rear motor support bracket 297. The forward end of bracket 289 is clamped against the inner lug 295 by a suitable washer 298 and a threaded plug 299 which fits within a threaded bore at the inner end of pin 294.

Foot pedal 98 is mounted upon a rigid lever 301 which extends from the driver's compartment through panel 97 and is then bent laterally and forwardly to terminate in an elongated hollow boss 302. Boss 302 is machined to fit nugly but rotatably upon the inner portion of pin 288 so that the combination clutch and brake control lever 301 is rotatably supported upon pin 288. Boss 302 is provided with a rigid arm 303 which extends upwardly substantially normal to lever 301 and terminates in a forwardly disposed lug 304. Preferably lever 301, boss 302, arm 303 and lug 304 are integral although if desired they may comprise separate elements rigidly secured together.

Inwardly of arm 303, boss 302 is provided with an integral arm 305 extending generally parallel to arm 303 but being bent slightly inwardly therefrom to terminate in a hollow boss 306. A yoke 307 is provided with an internally threaded body portion and a pair of apertured arms 308 and 309 which embrace opposite sides of boss 306 and are pivotally secured thereto by a suitable pivot pin assembly designated at 311.

Figure 24:
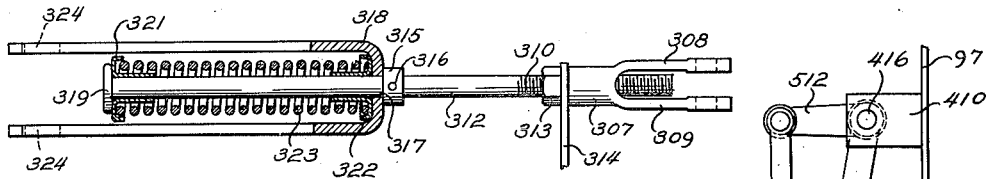
Figure 24 is an enlarged plan view partly in section illustrating the resilient clutch release rod.

Yoke 307 (see Figure 24) is adjustably mounted upon the threaded end 310 of a rod 312 and is held in adjusted position thereon by a suitable locknut 313 and clip 314. Rod 312 is provided with an enlarged collar 315 non-rotatably secured thereto as by a pin 316 and extends through an aperture 317 at the end of a substantially U-shaped strap 318 to terminate in an enlarged head portion 319 disposed between the legs of the strap.

A pair of oppositely disposed cupped spring retainer elements 321 and 322 are slidably mounted on rod 312 between head 319 and strap 318 and a coiled compression spring 323 surrounding rod 312 has its opposite ends fitted within the cupped retainers. Compression spring 323 tends to expand and force strap 318 against fixed collar 315. The legs of strap 318 extend beyond head 319 and are provided with aligned apertures 324.

The clutch release rod above defined is flexible in the direction of its length for a purpose later to be described. The overall length of the clutch release rod can be varied by adjustment of yoke 307 along the threaded rod portion 310.

A conventional clutch operating shaft 325 extends laterally from clutch housing. A split collar 326 having matched lips 327 and 328 extending substantially radially therefrom is mounted upon shaft 325. Lips 327 and 328 are provided with aligned apertures through which pass a bolt 329 whose threaded end contains a suitable locknut 331. When nut 331 is tightened collar 326 is secured tightly upon shaft 325. Collar 326 is provided with a downwardly extending arm 332 which terminates in an apertured cylindrical portion 333 embraced by the legs of strap 318. A suitable pivot pin assembly 334 maintains strap 318 and arm 332 pivotally connected to each other.

Collar 326 is also provided with an upwardly extending arm 335 which terminates in a lateral internally threaded boss 336 in which is rotatably disposed an elongated adjustment screw 337 having a head 338 designed to be fitted by a wrench or a similar tool. A portion of the clutch housing surface is preferably made flat to provide a positive surface stop 339 for engaging the tip end of screw 337 as will later be described. Collar 326 and arms 332 and 335 are preferably integral. The position of screw 337 with respect to stop 339 can be varied by rotation of screw 337 and lock nut 341 maintains this adjustment.

A collar 342 which fits snugly between lugs 295 and 296 is rotatably journaled on pin 294 and is provided with an integral downwardly extending arm 343. Arm 343 terminates in a boss 344 in which is non-rotatably secured a pivot pin 345 which extends laterally in opposite directions from boss 344. A lost motion connection is provided between pin 345 and lug 304 on control lever 301. This connection comprises a rod 346 provided at its rear end with a yoke 347 whose arms embrace opposite sides of lug 304. Lug 304 and the arms of yoke 347 are provided with aligned apertures for receiving a suitable pivot pin assembly comprising a headed pin 348 passing through the apertures and a cotter key 349.

The forward end of rod 346 is threaded at 351 and extends through an aperture in a strap 352 where it is provided with a nut 353 engaging the inner surface of strap 352. A lock washer 354 is maintained against the outer surface of strap 352 by a suitable nut 355. Obviously strap 352 can be adjusted along rod 346 and held in adjusted position by nuts 353 and 355.

The opposite ends of strap 352 are bent forwardly, preferably at an angle of more than 90°, and are further bent at their forward ends to extend parallel to each other with their inner surfaces contacting, thus providing a suitable space 356 in which the threaded end of rod 346 is disposed and a straight flat end portion 357. The doubled strap end portions are preferably secured together by welding to obtain an integral strap portion at 357. Strap portion 357 is slotted longitudinally adjacent its forward end at 358 to receive the inner projecting end of pin 345. A suitable cotter key 359 maintains strap portion 357 from sliding axially beyond the end of pin 345. In this manner strap 352 is slidably and pivotally connected with arm 343.

Service brake control lever 94 is provided at its lower end with a hollow cylindrical formation 361 by which it is rotatably mounted upon rigid pin 288 between boss 302 on the clutch and brake control lever 301 and the socket forming boss 286' secured to the chassis. A suitable spring (not shown) tends to pull lever 94 counterclockwise about its pivot. A lost motion connection is provided between lever 94 and pin 345. This connection comprises a strap 362 made up of two parallel strips 363 and 364 secured together as by welding along their entire lengths except at the rear where they flare outwardly to form a yoke 365 designed to embrace a projecting lug 366 on lever 94. A suitable pivot assembly comprising a headed pin 367 passing through aligned apertures in the yoke and lug and a cotter key 368 is provided between strap 362 and lever 94.

Adjacent its forward end strap 362 is slotted longitudinally at 369 to receive the outer projecting end of pin 345. Thrust washer 371 and cotter key 372 cooperate to prevent strap 362 from sliding axially beyond the outer end of pin 345. In this manner strap 362 is slidably and pivotally connected to arm 343.

Above arm 343, collar 342 is provided with an integral upwardly extending arm 373 which terminates in a hollow boss 374. A brake operating rod 375 is provided with a yoke 376 at its rear end embracing boss 374 and a suitable pivot pin assembly comprising a headed pin 377 passing through aligned apertures in boss 374 and yoke 376 and a cotter key 378 is provided between brake rod 375 and arm 373.

Rod 375 is connected at its forward end through a conventional hydraulic brake bellows 379 to a master hydraulic brake cylinder assembly 381 rigidly mounted upon motor support 297. Preferably brake cylinder 381 and motor support 297 are provided with mated flanges 382 and 383, respectively, secured together by a suitable fastening means such as bolts 384.

The ratchet mechanism for holding the service brake in applied position until released by manipulation of the gear shift lever will now be described.

A ratchet supporting bracket 385 is secured in a suitable manner, as by bolts 386, upon the front surface of panel 97. Bracket 385 is provided with spaced forwardly projecting bosses 387 and 388 which have aligned apertures in which are secured opposite ends of a ratchet pivot pin 389. Between bosses 387 and 388 a collar 391 having an integral downwardly extending arm 392 is rotatably mounted upon pin 389. A segmental ratchet member 393 having a plurality of teeth 394 is provided with rear edge slots 395 and 396 fitting over the shanks of suitable bolts 397 passing between the arms of the bifurcated lower end of arm 392. When bolts 397 are tightened, ratchet member 393 is secured upon arm 392 and the provision of slots 395 and 396 permits the easy removal and replacement of ratchet member 393 when it is worn or broken.

Collar 391 is also provided with an upwardly extending integral arm 398 terminating in a boss 399 which is embraced by the arms of a yoke 401 at the rear end of a forwardly extending rod 402. A suitable pivot assembly comprising a headed pivot pin 403 passing through aligned apertures in yoke 401 and boss 399 and a cooperating cotter key 404 is provided between rod 402 and arm 398.

The forward end of rod 402 is threaded at 405 and a yoke 406 having a threaded body portion is maintained in adjusted position on rod 402 by a suitable nut 407. The arms of yoke 406 embrace the upper end of arm 303 and a suitable pivot assembly comprising a headed pivot pin 408 extending through aligned apertures in the arm 303 and yoke 406 and a cotter key 409 provide a pivotal connection between rod 402 and arm 303. The purpose of this connection will be described later.

Above bracket 385 a substantially U-shaped bracket 410 having forwardly extending legs 411 and 412 is secured upon the front surface of panel 97 by suitable means such as bolts 413. Reenforcing plates 414 and 415 are secured on the inner surfaces of legs 411 and 412, respectively. A laterally extending rock shaft 416 passes through aligned apertures in legs 411 and 412 and plates 414 and 415 and in this manner is rotatably supported upon bracket 410. The inner end of shaft 416 extends beyond leg 411 and is non-rotatably secured to the lower end of an upwardly extending rigid link 417. The upper end of link 417 is provided with a threaded stud 418 secured to link 417 by nuts 419 and provided at its free end with a ball 421 cooperating with a suitable spring socket 422 which is maintained by a suitable nut 423 upon one end of a forwardly extending operating rod 424. A yoke 425 is provided at the forward end of rod 424 for embracing a lug 426 which is preferably integral with one of the mated clamp members 427 and 428 secured by bolts 429 upon the lower end of transmission lever 92 just above its place of entrance into the transmission assembly. A suitable pivot assembly comprising a headed pivot pin 431 extending through aligned apertures in yoke 425 and lug 426 and a cooperating cotter key 432 provide a pivotal connection between lever 92 and rod 424.

A short forwardly extending rigid link 433 is non-rotatably secured to the outer end of shaft 416 beyond leg 412 and terminates in a flat-sided boss 434. A yoke 435 has a hollow threaded body portion mounted upon the threaded end 436 of a downwardly extending rod 437 and a pair of arms embracing boss 434. A suitable pivot assembly including a pivot pin 438 passing through aligned apertures in boss 434 and yoke 435 provides a pivotal connection between link 433 and yoke 435. A suitable nut 439 holds yoke 435 in a predetermined adjusted position on rod 437.

The lower end of rod 437 has slidably supported thereupon two pairs of oppositely facing cupped spring retainer elements designated at 441, 442, 443 and 444. A coiled compression spring 445 surrounds rod 437 and has its opposite ends disposed in upper opposed retainers 441 and 442. A similar coiled spring 446 also surrounds rod 437 and has its opposite ends disposed in lower opposed retainers 443 and 444. Rigid pins 447 and 448 extend through rod 437 adjacent retainers 441 and 444 and prevent springs 445 and 446 from moving retainers 441 and 444, respectively, toward opposite ends of rod 437.

Retainers 442 and 443 are urged against opposite sides of a lug 449 which surrounds shaft 437 and is preferably integral with the forward end of a ratchet dog operating lever 451 later to be described. The coil spring and retainer assembly above described is preferably provided with a cover of leather or the like to keep out dust and dirt and retain lubrication.

Ratchet support bracket 385 is provided with a laterally extending hollow cylindrical portion 452 in which is journaled a rock shaft 453. Shaft 453 extends laterally in both directions beyond the edges of portion 452. A coil spring 454 surrounds shaft 453 and has its opposite ends secured to shaft 453 and boss 387, respectively. Spring 454 tends to rotate shaft 453 in a clockwise direction. The other end of shaft 453 is provided with a flange 455 having spaced aligned laterally projecting pins 456 and 457. Preferably, pins 456 and 457 are integral with flange 455 which in turn is non-rotatably secured in some suitable manner upon the end of shaft 453.

Lever 451 is journaled at its rear end upon a pivot pin 458 which is non-rotatably secured in a socket forming boss 459 extending laterally from the lower end of bracket 385. A suitable nut and washer assembly 461 maintains lever 451 against axial movement on pin 458. Lever 451 extends forwardly from pin 458 to pass beneath pin 457, then turns upwardly at 462 substantially at right angles to pass between pins 456 and 457 and then turns forwardly again substantially at right angles to pass over the top of pin 456 and terminate in lug 449 about rod 437. A dog 463 having a projecting tooth 464 is non-rotatably mounted upon shaft 453 adjacent the outer edge of cylindrical portion 452 and below the ratchet member. Rotation of shaft 453 will rotate dog 463 into and out of engagement with teeth 394 on rack 393 during certain operating conditions later to be described.

In operation, the driver in the driver's compartment may operate both clutch and hydraulic service brake sequentially by stepping on pedal 98 to rotate lever 301 in a clockwise direction about its pivot upon pin 288. Rotation of lever 301 acts through arm 305, yoke 307, rod 312, strap 318 and arm 332 to rotate clutch shaft 325 in a direction tending to disengage the engaged clutch members inside clutch housing 282. The elements above mentioned are so designed that only a small angle of rotation of lever 301 about its pivot will cause complete disengagement of the clutch. Screw 337 is so positioned that its tip end engages the housing surface at 339 at the moment when the clutch members have been completely disengaged. Further movement of lever 301 after screw 337 has engaged stop 339 merely causes rod 312 to be pulled along strap 318 against the resistance of spring 323. In this manner continued rotation of lever 301 after the clutch has been disengaged will be entirely free of interference from the clutch springs inside clutch housing 282, and will be resisted only by the force required to compress spring 323 as the clutch release rod is elongated. Through screw 337 and nut 341 this control can be adjusted and fixed to suit the throwout position of any conventional clutch and the invention can be quickly mounted in any existing installation.

During the period that the clutch operating elements above described are disengaging the clutch the pedal controlled service brake elements comprising rod 346 and strap 352 are pulled rearwardly due to the positive pivotal connection between arm 303, integral with lever 301, and rod 346. However, slot 358 at the lower end of strap 352 is so designed and placed with respect to pin 345 that strap 352 must travel a substantial distance before the forward end of slot 358 engages pin 345 to cause rotation of brake operating arm 343. By manipulation of the adjustment nuts at 353 and 355, strap 352 can be adjusted along rod 346 and the position of the forward end of slot 358 can be accurately set with respect to pin 345 so that engagement of strap 352 and pin 345 takes place just after the clutch members have been disengaged and the tip of screw 337 contacts stop 339.

Continued rotation of lever 301 about its pivot after pin 345 has been engaged by the forward end of slot 358 causes brake operating arms 343 and 373 to rotate counterclockwise about pin 294 and consequent advance of brake operating rod 375 to apply the hydraulic service brakes. When pressure of the operator's foot is released at pedal 98 heavy return springs (not shown) tend to rotate lever 301 in a counter-clockwise direction and return the parts to the position shown in Figure 22.

The service brakes may also be controlled by manipulation of lever 94. The operator in the driver's compartment grasps the upper portion 95 of lever 94 and pulls rearwardly to rotate lever 94 in a clockwise direction about its pivot 288. In Figure 22, lever 94 is shown in its foremost forward brake released position and strap 362, connecting lever 94 and brake operating arm 343, is disposed with the forward end of slot 369 in engagement with pin 345 on arm 343. With the parts in this position it is obvious that clockwise rotation of lever 94 will cause immediate application of the service brakes. A suitable heavy return spring extending between lever 94 and the chassis (not shown) tends to maintain lever 94 in the full line position of Figure 22.

Slot 369 is designed to prevent the hand service brake control comprising lever 94 and strap 362 from interfering with the pedal actuated service brake control. Starting with the parts in the position shown in Figure 22, brake applying motion of lever 301 causes arm 343 to rotate to apply the service brakes but that portion of the pin 345 which is disposed in slot 369 merely travels rearwardly in the slot and lever 94 remains stationary.

Similarly slot 358 in strap 352 is designed to prevent the foot pedal linkage from interfering with brake applying motion of lever 94. Starting with the parts as shown in Figure 22, clockwise rotation of lever 94 rotates arm 343 to apply the service brakes but that portion of pin 345 which is disposed in slot 358 merely travels rearwardly in the slot and the foot pedal linkage remains stationary. Brake release movements of levers 301 and 94 involve only a reversal of the operations above described.

The ratchet mechanism mounted on panel 97 is designed to cause the foot pedal actuated service brake mechanism to be locked in brake applied positions and manipulation of a vehicle control, other than a service brake control, is required to unlock the brake mechanism to release the brakes.

With the parts as shown in Figure 22, foot pedal lever 301 is in brake release position and the gear shift lever 92 of the conventional selective transmission is in neutral position. When lever 301 is rotated to apply the service brakes the ratchet operating linkage comprising yoke 406, rod 402 and arm 398 causes rotation of ratchet arm 392 in a clockwise direction. As arm 392 moves forwardly, ratchet member 393 engages dog tooth 464 and causes counterclockwise rotation of the resiliently mounted dog 463 against the force of spring 454. Further brake applying movement of lever 301 causes ratchet teeth 394 to slide over tooth 464 but when the operator releases pressure on pedal 98 to permit return movement of the brake operating linkage, dog tooth 464 is forced upwardly through the action of spring 454 into engagement with the teeth of segmental ratchet member 393 and to prevent such return movement thereby locking the service brake in applied position. The resilient connection between rod 437 and lug 449 provides an effective lost motion connection which compensates for wear and allows application of this linkage to any conventional transmission.

Dog tooth 464 cannot be released by manipulation of any of the service brake controls and is released only when the gear shift lever 92 has been moved out of neutral position into a position where the transmission gears transmit drive to the driving wheels. When lever 92 is pulled rearwardly, as to select either first or high speed of the standard gear shift arrangement, rearward movement of rod 424 causes clockwise rotation of rock shaft 416 which in turn causes rod 437 to be pulled upwardly through arm 433.

Upward movement of rod 437 causes lever 451 to rotate in a clockwise direction about its pivot at 458. During such rotation lever 451 engages the under side of pin 457 thereby rotating shaft 453 and dog 463 counterclockwise to disengage tooth 464 from ratchet teeth 394. Preferably the resilient connection between rod 437 and lug 449 is such that the pull exerted upon lever 451 by merely shifting the gear lever 92 is not quite sufficient to rock dog 463 and it is necessary to simultaneously step on pedal 98 to rock the ratchet slightly to separate tooth 464 from the undercut ratchet teeth portions at 394. In this movement rotation of the shaft is opposed by spring 454 which is designed to return shaft 453 to the position shown in Figures 22 and 23 when the gear shift lever is in neutral. After release, ratchet arm 392 is free to swing rearwardly and no longer interferes with the return movement of lever 301 whereby the service brakes are released from foot pedal control.

With reference to Figure 22, it will be apparent that when lever 92 is pushed forwardly, as to select reverse or second speed positions, rod 424 will be pulled forwardly to rock shaft 416 in a counterclockwise direction and thereby cause downward movement of rod 437. This causes lever 451 to be rotated counterclockwise about its pivot at 458 but such movement causes the under side of lever 451 to engage the top side of pin 456 whereby shaft 453 is rotated in a counterclockwise direction to tend to release dog tooth 464 from ratchet teeth 394 as described above. Thus movement of gear shift lever out of neutral to select any driving speed accompanied by pressure on pedal 98 will release the service brake locking mechanism. It is often customary during operation of a vehicle to decelerate merely by stepping temporarily on the brake pedal without placing the gear shift lever in neutral. Since tooth 464 is held out of the path of ratchet teeth 394 when the gear shift lever is not in neutral there is no danger that the brake mechanism will become locked under such driving conditions.

Figure 25:
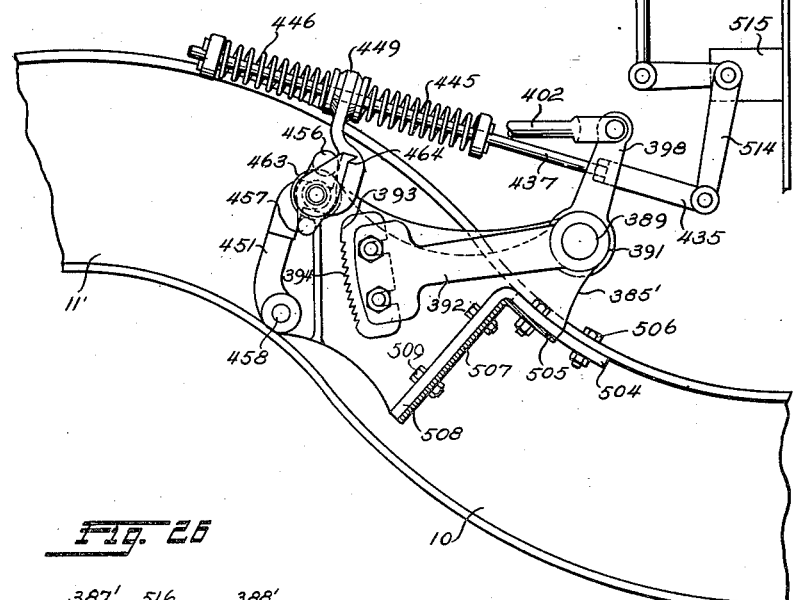
Figure 25 is a side view of another embodiment of the clutch and brake control linkage, somewhat similar to Figure 22, but in which the transmission lever controlled ratchet is supported by a chassis cross member.

In the embodiment of the invention illustrated in Figure 25 the service brake mechanism is mounted on a lateral chassis member rather than on the body panel 97 as illustrated in Figure 22.

Oppositely disposed support plates 504 are secured to the under sides of the top legs of chassis members 11'. A lateral chassis member 505 extends between plates 504 and chassis members 11', and support plates 504 and member 505 are preferably rigidly secured to each other, preferably by a plurality of bolts 506.

Adjacent left chassis member 11' lateral member 505 is provided with a downwardly extending leg 507 disposed substantially at right angles thereto. The upper surfaces of member 505 and leg 507 cooperate to form a seat for receiving the recessed flanged portion 508 of ratchet bracket 385'. Suitable fastening means such as bolts 509 maintain bracket 385' upon member 505. Other than its recessed flanged portion 508, bracket 385' is preferably identical with bracket 385 of Figure 22 and rotatably supports a pivot pin 389 upon which is secured an integral ratchet arm assembly comprising collar 391 and arms 398 and 392. Arm 392 is pivotally connected to brake operated arm 402 just as shown in Figure 22.

The mechanism for releasing dog tooth 464 from ratchet teeth 394 is somewhat different from that shown in Figure 22 and comprises an operating rod 424' (similar to rod 424 of Figure 22) pivotally connected to one end of an arm 511 which is non-rotatably secured upon one end of rock shaft 416. A forwardly extending arm 512 is secured non-rotatably upon the other end of shaft 416 and is pivotally connected to one end of a downwardly extending link 513. At its lower end link 513 is pivotally connected to one end of a bell crank 514 journaled upon bracket 515 secured to panel 97. The other end of bell crank 514 is pivotally connected to yoke 435 on the ratchet dog operating rod 437.

Manipulation of the gear shift lever acts through rod 424', arm 511, rock shaft 416, arm 512, link 513 and bell crank 514 to shift rod 437 axially and operate the ratchet dog release lever 451 in the same manner as described above with respect to Figure 22.

The above described arrangement facilitates line assembly since the ratchet bracket is secured directly to the chassis which also provides a more substantial support than the body panel 97, resulting in improved operation of the whole ratchet assembly.

Figure 26:
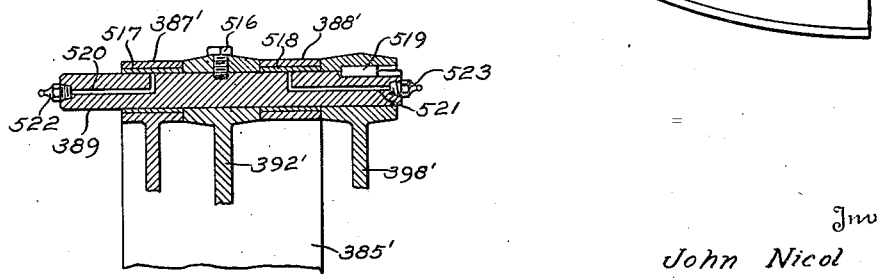
Figure 26 is a section illustrating another embodiment of the control lever arrangement at the ratchet shaft in Figure 25.

In Figure 26 a modified arrangement of the ratchet assembly is illustrated wherein the integral ratchet bearing member of Figure 25 is made up of two separate arms each non-rotatably secured to shaft 389. Ratchet bearing arm 392', corresponding to arm 392 in Figure 25, is non-rotatably secured as by a set screw 516 upon shaft 389 which is journaled in bearing liners 517 and 518 in bosses 387' and 388' of bracket 385'. Arm 398' corresponding to arm 398 of Figure 25 is non-rotatably secured to shaft 389 as by a suitable key and slot assembly designated at 519.

Lubrication for shaft 389 is provided by the use of suitable lubricant channels 520 and 521 which extend from lubricant fittings 522 and 523, respectively, to the bearing surfaces at 517 and 518, respectively.

Hand emergency brake

The hand emergency brake lever 96 extends through wall 81 to the rear and slightly to the left of the steering column as shown in Figure 6 and is pivotally supported upon a suitable pivot pin assembly 465 mounted on a suitable supporting bracket 466 as shown in Figure 22. Bracket 466 is preferably secured to an upright member (not shown) rigidly fastened to a chassis member 11' but may be rigidly supported in any desired manner upon the chassis.

A pivoted pawl 467, adapted to engage with ratchet teeth 468 to hold the emergency brake in applied position, is mounted upon the lower end of lever 96 and is controlled by the conventional push button 469 at the top of lever 96 as shown in Figure 6. A brake operating rod 471 is pivotally secured at 472 to the lower end of lever 96.

With reference to Figure 23, a rock shaft 473 is journaled at one end in a bracket 474 secured to the front side of panel 97 above the ratchet supporting bracket 385 by bolts 475. The opposite end of shaft 473 (see Figure 23A) is journaled in a similar bracket 476 secured to panel 97 by bolts 477 or the like. A pair of downwardly extending preferably identical and parallel arms 478 and 479 are secured non-rotatably upon shaft 473 adjacent the inner sides of brackets 474 and 476, respectively.

The lower end of arm 478 is embraced by a yoke member 481 which is threadedly mounted upon the threaded end 482 of brake operating rod 471 and maintained against movement thereupon by locknut 483. A suitable pivot assembly including a pivot pin 484 passing through aligned apertures in yoke 481 and arm 478 provides a pivotal connection between rod 471 and arm 478.

The lower end of arm 479 is embraced by the arms of a yoke member 485 which is preferably integral with one end of a rod 486 whose forward end is threaded at 487. A connecting member having an internally threaded body 488 fitting over the threaded portion 487 of rod 486 is apertured at its forward end to fit over a suitable pivot pin 491 secured to a cam member 492. A suitable fastening means such as lock nut 489 maintains member 488 in adjusted position. Cam member 492 is pivotally mounted upon a pin 493 secured to the free end of a rigid bracket 494 which is preferably fastened to the transmission housing 283 by a suitable means such as bolts 495. The cam surface of cam member 492 rests upon a lip 495 formed upon the free end of the transmission brake strap 285 for a purpose to be later described.

In operation, when the top of lever 96 is pulled rearwardly by the driver, lever 96 rotates in a clockwise direction about pivot 465 thereby pulling rod 471 and arm 478 forwardly to cause rotation of shaft 473 in a clockwise direction. Such rotation of shaft 473 acts through arm 479 and rod 486 to rotate cam 492 in a counterclockwise direction about its pivot 493 whereby the cam displaces the free end of brake strap 285 to cause the brake strap to be wrapped about the peripheral surface of drum 284. Since my invention is concerned with the control rather than with the specific construction of the transmission brake no further description of the brake elements is believed necessary.

From the above it will be seen a simple positive operating linkage has been provided to adapt the hand emergency control brake lever for operation of the transmission brake from its new position to the left of the steering column. This operating linkage is applied to conventional brake structure so that no changes in the brake elements are necessary.

Accelerator pedal 496 is disposed on the floor of the driver's compartment and extends downwardly and upwardly to a support bracket 497 having a pivot pin 498 upon which pedal 496 is pivotally mounted. No further description of the accelerator mechanism will be given because such does not constitute part of the present invention.

As shown in Figure 22, the left front spring designated at 499 is pivotally supported at its rear end upon a suitable pin 501 mounted upon a bracket 502 secured as by bolts 503 to the outer side of chassis member 11'.

The above described clutch and brake control mechanism and emergency brake mechanism is disclosed and claimed in my copending application, Serial No. 364,082, filed November 2, 1940.

*Driver's seat*

The driver's seat may be mounted in a bracket arrangement at the rear of the through aisle to place it out of the way entirely or may be mounted in a floor socket in the through aisle and adjusted to enable the driver to assume half or full sitting positions while driving.

The seat is supported upon a substantially T-shaped upright 524 comprising a head 525 and a rearwardly extending vertical web 526. A lateral support plate 527 is secured upon the upper forward surface of head 525, preferably by welding, and is provided with cut-out portions 528 and 529 at its upper outer corners. Intermediate portions 528 and 529, plate 527 is bent rearwardly substantially at right angles at 530 to lie along the top edge of upright 524 and terminates in a shoulder 531. Web 526 is beveled rearwardly and downwardly from shoulder 531 as indicated at 532.

Loops 533 and 534 of rigid material, preferably sheet metal, are secured to the upper corners of plate 527 at cut-out portions 528 and 529, respectively. Loops 533 and 534 are preferably identical. As shown in Figure 31, loop 533 comprises a strap having its opposite ends secured together in full surface engagement to form a downwardly extending flange 535 and its intermediate portion bent to provide the substantially circular loop 533. Flange 535 may be secured upon the inner surface of plate 527 in any suitable manner. Preferably, however, the strap ends at 535 and plate 527 are secured together to form a substantially integral structure by a single welding operation.

A substantially U-shaped back support member 536 has a substantially horizontal portion 537 extending through loops 533 and 534 and is bent upwardly at each end to form side posts 538 and 539. Member 536 is preferably circular so that it is rotatably supported by loops 533 and 534 and is preferably a hollow pipe member to provide a rigid but light back support. A pair of arcuate stop members 540 and 550 are secured as by welding to the rear surface of pipe portion 537 adjacent loops 533 and 534, respectively. Stop members 540 and 550 cooperate with stop shoulder 531 (see Figure 30) to limit clockwise rotation of the back support member about its hinge. As shown in Figure 28 the back rest member is permitted to rotate to a position where it is maintained by gravity when in use. Posts 538 and 539 are provided with suitable end caps 541 and 542, respectively.

A curved back rest 543 is provided with a supporting strap 544 secured in any suitable manner along the rear surface thereof and bent forwardly at opposite ends 545 and 546 to fit against the inner sides of posts 538 and 539, respectively.

Suitable fastening means, such as bolt assemblies 547 and 548, are provided at each end of strap 544 to secure strap 544 non-rotatably upon the posts.

Seat cushion member 549 is secured by suitable fastening means designated at 551 upon the upper surface of seat plate 552. Plate 552 is provided at opposite corners with rearwardly extending, preferably integral, portions which are bent about pipe 537 outside loop 533 and 534, respectively, to form seat supporting loops 553 and 554, respectively. As shown in Figure 32, loop 553 is closed about pipe 537 by welding the inner edge of the bent plate extension to the bottom surface of plate 552 at 555. Loop 554 is formed about pipe 537 in the same manner.

As described above, back support member 536 is rotatably mounted in the hinge formed by loops 533 and 534 and prevented from falling over backward by stop shoulder 531. The seat supporting plate is rotatably supported by loops 553 and 554 upon the horizontal portion 537 of the back rest member. Suitable means are provided for latching the seat in operative position as shown in dotted lines in Figure 28. A pair of parallel angle members 556 and 557 have one leg secured in any suitable manner upon the bottom surface of seat plate 552 and are provided with downwardly extending legs which have aligned apertures adjacent their forward ends.

A substantially U-shaped support 558 is provided with a horizontal portion 559 adapted to be disposed in a pocket 561 on upright 524 and two upwardly and forwardly extending arms 562 and 563 which are bent laterally at their upper ends at 564 and 565, respectively, to extend through the apertures in angles 556 and 557, respectively. Suitable cotter pins or other fastening means are provided at the outer ends of arm extensions 564 and 565 and support 558 is thereby hinged upon the bottom of seat plate 552. When the seat is in raised position, the parts are in the position shown in Figure 27 and in dotted lines in Figure 28. Pocket 561 is preferably formed by welding or otherwise securing one end of a flat plate 566 to the forward surface of head 525 and bending the plate outwardly and upwardly to form an open top pocket within which portion 559 of the support is designed to fit. Accidental movement of portion 559 out of pocket 561 is prevented by latch 567 which is provided with a suitable pivot assembly 568 upon web 526 and extends through an aperture 569 in head 525 into engagement with the inner surface of plate 566 thereby closing the top of the pocket 561.

Latch 567 is urged in a clockwise direction to keep the pocket closed by a suitable spring 571 at its pivot. When it is desired to fold the seat to the full line position of Figure 28, latch 567 is rotated against the pressure of spring 571 to uncover the top of pocket 561 and allow the lower end of support 558 to be removed from the pocket. The seat is then free to fold downwardly about pipe 537 as a pivot with support 558 hanging loosely along the lower surface of head 525. The back support member can then be swung about pipe 537 as a pivot into the full line position shown in Figure 28 and the seat assembly is ready for removal.

With reference to Figures 27 and 28, the lower portion of upright web 526 is provided at opposite sides with oppositely extending angle members 572 and 573. Web 526 is provided with a plurality of vertically spaced apertures 574. The vertical legs of angle members 572 and 573 are apertured so that the angles can be secured upon opposite sides of web 526 adjacent any desired aperture 574 by means of a suitable bolt and nut assembly 575 extending through aperture 574 and the apertures in the legs of the angles.

Web 67 is provided with upper and lower flanges 576 and 577 which are preferably integral therewith. Intermediate plates 576 and 577, a generally T-shaped socket member 578 designed to receive the lower end of upright 524 is mounted.

When it is desired to use the seat while driving, the lower end of upright is thrust through a suitable aperture in the floor mat generally indicated at 579 in Figure 27 and a similar aperture in the floor 75 into socket 578. Horizontal legs on angles 572 and 573 serve as stops for limiting downward movement of upright 524 in the socket by engaging the top surface of mat 579 adjacent the mat aperture. Instead of assuming a full sitting position with the seat as shown in dotted lines in Figure 28, the driver may support himself in what might be termed a half-sitting position by folding the seat down into the full line position of Figure 28 and merely leaning back thereagainst to steady himself and partially relieve the strain caused by continuous standing.

When it is desired to drive the vehicle from a full standing position, the seat assembly is removed from the through aisle floor socket, folded and placed in the bracket arrangement of Figure 33. A pair of vertically aligned spaced brackets 581 and 582 are secured upon the front surface of panel 76 at the rear of the through aisle. A plurality of bolts 583 pass through lateral flanges 584 of the brackets and also through laterally bent portions of a sheathing member 585 which extends substantially from the level of the rear compartment floor to the through aisle floor. Sheathing 585 is preferably of light gauge sheet metal and, as shown in Figure 35, has its outer surface in full surface engagement with the inner surface of each bracket where it passes therethrough.

It will be seen, therefore, that sheathing 585 cooperates with panel 76 to form a long socket tunnel of substantially rectangular cross section which is designed to receive more than one third the entire length of upright 524 for supporting the driver's seat assembly in such a manner as not to interfere with passage along the through aisle.

Long wheel base truck

In Figure 36 is illustrated an embodiment of the invention comprising a vehicle designed especially for the delivery of long upright objects such as dresses and the like which are supported from hangers and cannot be folded or packed within the rear compartment. This type of vehicle is especially suited for dry cleaning delivery and comprises a chassis having an elongated drop portion 10' intermediate the front and rear wheels which are spaced a substantial distance further apart than in the embodiment of Figure 1.

A body 586 is supported on the chassis and is provided with a low through aisle floor 587 extending between opposite side door openings 588 adjacent the front end. Door openings 588 are substantially the same width as the side door openings in the embodiment of Figure 1 but the aisle floor 587, instead of terminating at the rear door posts as does the aisle floor shown in Figure 1, extends a substantial distance rearwardly along drop portion 10'. Floor 587 is preferably at least twice as long as the low aisle floor in Figure 1. Drive shaft housing 589 extends along floor 587 and is joined at one end with the front aisle panel 97 and at the other end with the rear aisle panel 591 which is substantially the same as panel 76 in Figure 1. Rear compartment floor 116' extends from the top edge of panel 591 to the rear of the body.

Forwardly of the side door openings the embodiment of Figure 36 is preferably the same as that shown in Figure 1. Body 586 is preferably constructed in the same manner as body 16 but is much longer and the rearwardly extending portion of low aisle 587 provides a loading floor which enables the operator to walk a substantial distance back into the body of the vehicle to gain access to the articles in the rear compartment.

Windshield defrosting system

The windshield defrosting system is best shown in Figures 36 and 37. Each side 592 of hood 14 is centrally hinged at 593 and in closed position rests upon a raised skeleton support comprising a strap 594, secured as by bolts 595 to laterally spaced portions of cowl 281. Suitable resilient strips of sponge rubber, felt or the like are permanently secured to straps 594 to prevent rattling of the hood. The rear edge of each hood portion 592 is spaced forwardly from the downwardly slanting lower windshield panel 597 to provide gaps 598 extending across the body just below and forwardly of the windshield which is designated at 100. Gaps 598 are preferably about 1/4" wide although any desired spacing may be used.

With the hood closed and the engine in operation, cool air is drawn from the atmosphere in front of the vehicle and is caused by the action of fan 599 to flow rearwardly past the radiator and heated motor and thence upwardly through the skeleton hood supports and gaps 598 to spread and pass in a fan-like formation along the outer glass surfaces of windshield 100. By the time the air has reached the windshield, it is thoroughly heated and will melt any snow, ice or similar formations due to low temperature which might have become deposited thereon. The heated air stream shown in arrows in Figure 36 will not only prevent further ice and snow formation on the windshield, but will maintain the windshield at a higher temperature than the outside atmosphere.

The vehicle of my invention above described has been designed to provide efficient multiple-stop delivery service at low cost and with a view toward easy control and operation and increased cargo space. By mounting the engine forwardly of the front axle and raising somewhat the cargo floor forwardly of the through aisle, the cargo space available at the forward end of the body has been practically doubled as compared with delivery trucks now in general use.

The body is a rigid assembly in which most of the elements are secured together permanently by welding. Besides the usual lateral members especially designed to rigidly maintain and strengthen the body, the rear through aisle panel and the instrument board are also designed to serve as additional body strengthening members. The low through aisle floor makes it easy to enter and leave the vehicle with a single step down to the curb and the provision of a driver's compartment forwardly of the through aisle keeps the aisle clear at all times so that there is no danger of tripping over the clutch and brake pedal or bumping into the steering wheel while passing along the aisle. All parts of the cargo are easily available from the through aisle or through the rear doors without the necessity of climbing into the body from the rear in spite of the fact that the body has more cargo space than other vehicles of the same wheel base.

The rear body compartment is insulated at the roof and floor and provided with a tightly fitting rear sliding door so that a considerable saving in refrigeration is possible by keeping the rear compartment closed until the cargo forwardly of the through aisle has been delivered.

The controls have been specially grouped and the driver's seating arrangement designed to fit the exacting conditions of multiple stop delivery. The driver may stand, or assume full or half sitting positions at the controls. When driving from the factory or other place of business to the district where deliveries are to be made, the seat may be thrust in the socket in the through aisle floor and the driver can be comfortably seated. When he reaches the delivery district, he may either fold the seat down and merely lean back on the same in a half sitting position or he may stack the seat in the bracket at the rear of the through aisle and stand, while driving, in the driver's compartment. The forwardly disposed position of the driver gives him better road vision while driving and it will be noted that the service hand brake lever and other controls are all adjacent the periphery of the steering wheel so that any of the vehicle controls are conveniently accessible and may be manipulated with very little effort while the driver maintains one hand on the steering wheel.

Additional features comprise a book storage compartment and a writing table at the front end of the body, specially designed double folding side doors provided with operating handles near the roof to clear the driver's head, a novel combination clutch and brake control which reduces the pressure required to operate the foot pedal, a battery support beneath the engine hood, a flexible fuel tank conduit and numerous other features described above and especially designed to give long life, low operating costs and efficient delivery service.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a delivery vehicle, a body having door openings at opposite sides and a through aisle of standing height clearance extending across said body between said door openings, a forwardly disposed raised platform inside said body, said platform being provided with grouped apertures through which vehicle controls extend upwardly and said platform having cargo spaces at opposite sides of said apertures, and means on said platform for preventing waste liquid from draining from said cargo spaces to said apertures on the floor of said aisle.

2. In a vehicle, a body having a transverse through aisle whose floor is disposed only a single short step above ground level and extends between aligned doorways at opposite sides of said body; a raised control platform disposed a substantial distance forwardly of the doorway at one side of said body; and a stand drive compartment floor, disposed at substantially the same level as said aisle floor extending between said platform and said aisle floor, said compartment floor being of sufficient area forwardly of the front edge of the doorway at that side to enable an operator to stand at said controls forwardly of said doorway so as not to obstruct passage along said aisle.

3. In the vehicle defined in claim 2, a raised cargo platform at the other side of the body from said stand drive compartment, the rear edge of said platform lying in substantial alignment with the front edge of the doorway at said other side.

4. A vehicle body, a side unit comprising a plurality of relatively light metal structural elements lying in substantially a single plane and welded together to form a unitary skeleton frame for resisting and distributing stresses incident to operation of the vehicle, and sheet metal external body panel means integrally united with said frame.

5. A vehicle body side unit comprising a front body corner post; a rear body corner post; a substantially continuous top rail interconnecting the top ends of said posts; means interconnecting the bottom ends of said posts comprising a bottom rail and arcuate front and rear wheel housing support members; a pair of spaced door posts extending between said top and bottom rails to define a doorway, all of said posts, rails and support members being integrally united to provide a rigid unitary skeleton frame and sheet metal external body side panels permanently united to said frame.

6. In a vehicle, a body having a pair of side units each comprising a unitary skeleton frame having a front body corner post and front and rear door posts defining aligned side doorways adapted to be connected by a through aisle in said body disposed substantially only a single step above the ground, a generally vertical aisle panel secured at opposite ends to the lower ends of said rear door posts; and an instrument board extending across the front of the body secured at opposite ends to said front body corner posts, said aisle panel and instrument board serving to tie said side units together and thereby serving as lateral body structural members for resisting and distributing operating stresses.

7. In a delivery vehicle or the like having a chassis supported by front and rear wheels; a body on said chassis having doorway openings at opposite sides intermediate the front and rear wheels and a low level through aisle whose floor is disposed only a single step above the ground upon which said wheels rest extending across the body between the doorway openings; upstanding corner posts at the front corners of said body, a generally vertical wall extending across the front end of said body between said corner posts, said wall being located a substantial distance forwardly of said aisle; and a raised platform within said body rearwardly of said wall but forwardly of said doorway openings, said platform providing a large area of front end cargo space forwardly of said doorway openings.

8. In a vehicle, a body having an elevated substantially horizontal platform within its front end, said platform having an apertured area and a large cargo area; upstanding dam members extending along the inner boundaries of said cargo area; and a low level floor within said body disposed immediately rearwardly of said platform and spaced from the roof to provide standing height clearance, said dam members preventing liquid from draining out of said cargo area into said apertured area or onto said floor.

9. A delivery vehicle body having a side doorway, an elevated cargo platform within said body forwardly of said doorway, a low floor opening to said doorway, said floor being spaced from the vehicle roof to provide standing height clearance within the body, and an upstanding rim extending along the rear edge of said platform, said rim preventing waste liquids from said cargo space from draining to said floor.

10. In a vehicle, a body having a side doorway, a floor within the body opening to said doorway and spaced from the body roof to provide standing height clearance, an extension of said floor forwardly of the front edge of said doorway, said floor extension being of sufficient size to provide a stand drive compartment wholly forwardly of said doorway wherein a driver may stand at the vehicle controls wholly forwardly of said doorway.

11. In a vehicle, a chassis; a body floor supporting portion having a plurality of rigid body supporting beams secured upon said chassis; a pair of body side wall units secured to opposite sides of said floor supporting portion, each of said body side wall units comprising a plurality of generally horizontal and vertical structural members welded into a unitary skeleton frame and external body panels secured upon said frame, the top member of said skeleton frame comprising a continuous roof rail extending the length of the side wall unit and the bottom member of said frame comprising a bottom side rail connected at opposite ends to an arcuate wheel housing supporting member; a roof unit bridging said side wall units; means securing opposite sides of said roof unit to said continuous roof rails; and rear wheel housings within said body secured between said floor supporting portion and the rear wheel housing support members.

12. A side wall unit for a vehicle body comprising a unitary skeleton frame made up of a plurality of generally horizontal and vertical structural metal elements welded together, a pair of said vertical elements being parallel and spaced to provide front and rear door posts for a doorway in said unit, and sheet metal body panels overlying said skeleton frame forwardly and rearwardly of said doorway, said panels being welded to said frame so as to provide an integral unit.

13. A side wall unit for a vehicle body comprising a unitary skeleton frame made up of a plurality of integrally united generally horizontal and vertical structural metal elements, certain of said elements comprising respectively a rear side door post, a rear body corner post and a horizontal panel brace whose opposite ends are welded to said posts, external sheet metal body panel means integrally united to said skeleton frame between said posts and resilient strip material between said brace and the interior of said panel means.

14. In a vehicle, a pair of integral side wall units defining opposite sides of the body of said vehicle, each of said units having a front body corner post, and a rigid, sturdy instrument board member extending across the front end of the body with its opposite ends secured to said body posts, said instrument board member thereby tying said side wall units together securely at their front ends and serving as a lateral body strengthening member.

15. In a vehicle body side wall unit, a rigid unitary skeleton frame comprising a continuous roof rail, an inclined front body corner post, a rear body corner post, a lower body side rail, arcuate rails connecting the opposite ends of said lower body side rail to the lower ends of said body corner posts, and parallel spaced door posts extending between said roof rail and the lower body side rail; and sheet metal body panels welded upon said skeleton frame forwardly and rearwardly of the doorway defined by said door posts.

JOHN NICOL.

CERTIFICATE OF CORRECTION.

Patent No. 2,233,323. February 25, 1941.

JOHN NICOL.

It is hereby certified that error appears in the printed specification of the above numbered patent requiring correction as follows: Page 6, first column, line 48, for "end" read --and--; page 10, first column, line 53, for "nugly" read --snugly--; page 16, second column, line 70, claim 1, for "on" read --or--; page 17, first column, line 16, claim 4, for "body, a side" read --body side--; line 61, claim 7, strike out the comma and insert instead a semicolon; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.

Disclaimer 2,233,323.—*John Nicol*, Detroit, Mich. VEHICLE. Patent dated Feb. 25, 1941.
  Disclaimer filed Feb. 27, 1951, by the assignee, *Divco Corporation*.
  Hereby enters this disclaimer to claims 4, 9, and 13 of said patent.
  [*Official Gazette March 27, 1951.*]